(12) United States Patent  
Moran et al.

(10) Patent No.: US 8,954,304 B2  
(45) Date of Patent: *Feb. 10, 2015

(54) NEURAL NET FOR USE IN DRILLING SIMULATION

(71) Applicant: Smith International, Inc., Houston, TX (US)

(72) Inventors: David P. Moran, Woodlands, TX (US); Mark P. Frenzel, Sugar Land, TX (US); Roy Duncan, Aberdeen (GB)

(73) Assignee: Smith International, Inc., Houston, TX (US)

( * ) Notice: Subject to any disclaimer, the term of this patent is extended or adjusted under 35 U.S.C. 154(b) by 299 days.

This patent is subject to a terminal disclaimer.

(21) Appl. No.: 13/645,562

(22) Filed: Oct. 5, 2012

(65) Prior Publication Data

US 2013/0036077 A1    Feb. 7, 2013

Related U.S. Application Data

(63) Continuation of application No. 12/105,108, filed on Apr. 17, 2008, now Pat. No. 8,285,531.

(60) Provisional application No. 60/912,820, filed on Apr. 19, 2007.

(51) Int. Cl.  
*G06G 7/48* (2006.01)

(52) U.S. Cl.  
USPC .......................................................... 703/10

(58) Field of Classification Search  
CPC ... E21B 2041/0028; E21B 44/00; E21B 7/00; E21B 7/068; E21B 10/00; G05B 13/027  
USPC ...................................................... 703/6, 10  
See application file for complete search history.

(56) References Cited

U.S. PATENT DOCUMENTS

| 5,730,234 A | 3/1998 | Putot |
| 5,812,068 A | 9/1998 | Wisler et al. |
| 6,002,985 A | 12/1999 | Stephenson |
| 6,012,015 A | 1/2000 | Tubel |

(Continued)

FOREIGN PATENT DOCUMENTS

| WO | 00/12859 A2 | 3/2000 |
| WO | 00/12860 A2 | 3/2000 |

OTHER PUBLICATIONS

The Computer Simulation of the Interaction Between Roller Bit and Rock; Author: D. Ma et al.; Society of Petroleum Engineers (SPE); Paper No. 29922.  
Drag Bit Performance Modeling; Author: T.M. Warren et al.; Society of Petroleum Engineers (SPE) Paper No. 15618.  
Laboratory Drilling Performance of PDC Bits; Author: T.M. Warren et al.; Society for Petroleum Engineers (SPE); Paper No. 15617.

(Continued)

*Primary Examiner* — Aniss Chad  
(74) *Attorney, Agent, or Firm* — Osha Liang LLP

(57) ABSTRACT

A method of optimizing a drilling tool assembly including inputting well data into an optimization system, the optimization system having an experience data set and an artificial neural network. The method further including comparing the well data to the experience data set and developing an initial drilling tool assembly based on the comparing the well data to the experience data, wherein the drilling tool assembly is developed using the artificial neural network. Additionally, the method including simulating the initial drilling tool assembly in the optimization system and creating result data in the optimization system based on the simulating.

20 Claims, 14 Drawing Sheets

(56) References Cited

U.S. PATENT DOCUMENTS

| | | | |
|---|---|---|---|
| 6,021,377 | A | 2/2000 | Dubinsky et al. |
| 6,044,325 | A | 3/2000 | Chakravarthy et al. |
| 6,349,595 | B1 | 2/2002 | Civolani et al. |
| 6,424,919 | B1 | 7/2002 | Moran et al. |
| 6,516,293 | B1 | 2/2003 | Huang et al. |
| 6,732,052 | B2 | 5/2004 | Macdonald et al. |
| 7,085,696 | B2 | 8/2006 | King |
| 7,142,986 | B2 | 11/2006 | Moran |
| 2004/0211596 | A1 | 10/2004 | Huang |
| 2004/0256152 | A1 | 12/2004 | Dashevskiy et al. |

OTHER PUBLICATIONS

PCT International Search Report issued in PCT Application No. PCT/US2008/060909 dated Aug. 29, 2008 (3 pages).

PCT Written Opinion issued in PCT Application No. PCT/US2008/060909 dated Aug. 29, 2008 (5 pages).

Examination Report issued in corresponding British Patent Application No. GB0917862.5; Dated May 3, 2011 (2 pages).

Examination Report issued in corresponding British Application No. GB0917862.5; Dated Nov. 9, 2011 (2 pages).

Examination Report issued in corresponding British Application No. GB0917862.5; Dated Apr. 12, 2012 (5 pages).

NEURAL NET FOR USE IN DRILLING SIMULATION

CROSS-REFERENCE TO RELATED APPLICATIONS

This application is a continuation application and claims benefit under 35 U.S.C. §120 to U.S. patent application Ser. No. 12/105,108, filed Apr. 17, 2008, which, pursuant to 35 U.S.C. §119(e), also claims priority to U.S. Provisional Application Ser. No. 60/912,820, filed Apr. 19, 2007. Both applications are incorporated by reference in their entirety.

BACKGROUND

1. Field of the Disclosure

Embodiments disclosed herein are related generally to the field of well drilling. More specifically, embodiments disclosed herein relate to methods of optimizing drilling tool assemblies for use in well drilling operations. More specifically still, embodiments disclosed herein relate to methods of optimizing drilling tool assembles using artificial neural networks.

2. Background Art

FIG. 1 shows one example of a conventional drilling system for drilling an earth formation. The drilling system includes a drilling rig 10 used to turn a drilling tool assembly 12 which extends downward into a wellbore 14. Drilling tool assembly 12 includes a drilling string 16, a bottom hole assembly ("BHA") 18, and a drill bit 20, attached to the distal end of drill string 16.

Drill string 16 comprises several joints of drill pipe 16a connected end to end through tool joints 16b. Drill string 16 transmits drilling fluid (through its central bore) and transmits rotational power from drill rig 10 to BHA 18. In some cases drill string 16 further includes additional components such as subs, pup joints, etc. Drill pipe 16a provides a hydraulic passage through which drilling fluid is pumped. The drilling fluid discharges through selected-size orifices in the bit ("jets") for the purposes of cooling the drill bit and lifting rock cuttings out of the wellbore as it is being drilled.

Bottom hole assembly 18 includes a drill bit 20. Typical BHAs may also include additional components attached between drill string 16 and drill bit 20. Examples of additional BHA components include drill collars, stabilizers, measurement-while-drilling ("MWD") tools, logging-while-drilling ("LWD") tools, and downhole motors.

In general, drilling tool assemblies 12 may include other drilling components and accessories, such as special valves, kelly cocks, blowout preventers, and safety valves. Additional components included in drilling tool assemblies 12 may be considered a part of drill string 16 or a part of BHA 18 depending on their locations in drilling tool assembly 12.

Drill bit 20 in BHA 18 may be any type of drill bit suitable for drilling earth formation. The most common types of earth boring bits used for drilling earth formations are fixed-cutter (or fixed-head) bits, roller cone bits, and percussion bits. FIG. 2 shows one example of a fixed-cutter bit. FIG. 3 shows one example of a roller cone bit.

Referring now to FIG. 2, fixed-cutter bits (also called drag bits) 21 typically comprise a bit body 22 having a threaded connection at one end 24 and a cutting head 26 formed at the other end. Cutting head 26 of fixed-cutter bit 21 typically comprises a plurality of ribs or blades 28 arranged about a rotational axis of the bit and extending radially outward from bit body 22. Cutting elements 29 are preferably embedded in the blades 28 to engage formation as bit 21 is rotated on a bottom surface of a wellbore. Cutting elements 29 of fixed-cutter bits may comprise polycrystalline diamond compacts ("PDC"), specially manufactured diamond cutters, or any other cutter elements known to those of ordinary skill in the art. These bits 21 are generally referred to as PDC bits.

Referring now to FIG. 3, a roller cone bit 30 typically comprises a bit body 32 having a threaded connection at one end 34 and one or more legs 31 extending from the other end. A roller cone 36 is mounted on a journal (not shown) on each leg 31 and is able to rotate with respect to bit body 32. On each cone 36, a plurality of cutting elements 38 are shown arranged in rows upon the surface of cone 36 to contact and cut a formation encountered by bit 30. Roller cone bit 30 is designed such that as it rotates, cones 36 of bit 30 roll on the bottom surface of the wellbore and cutting elements 38 engage the formation therebelow. In some cases, cutting elements 38 comprise milled steel teeth and in other cases, cutting elements 38 comprise hard metal inserts embedded in the cones. Typically, these inserts are tungsten carbide inserts or polycrystalline diamond compacts, but in some cases, hardfacing is applied to the surface of the cutting elements to improve wear resistance of the cutting structure.

Referring again to FIG. 1, for drill bit 20 to drill through formation, sufficient rotational moment and axial force must be applied to bit 20 to cause the cutting elements to cut into and/or crush formation as bit 20 is rotated. Axial force applied to bit 20 is typically referred to as the weight on bit ("WOB"). Rotational moment applied to drilling tool assembly 12 by drill rig 10 (usually by a rotary table or a top drive) to turn drilling tool assembly 12 is referred to as the rotary torque. The speed at which drilling rig 10 rotates drilling tool assembly 12, typically measured in revolutions per minute ("RPM"), is referred to as the rotary speed. Additionally, the portion of the weight of drilling tool assembly 12 supported by a suspending mechanism of rig 10 is typically referred to as the hook load.

The speed and economy with which a wellbore is drilled, as well as the quality of the hole drilled, depend on a number of factors. These factors include, among others, the mechanical properties of the rocks which are drilled, the diameter and type of the drill bit used, the flow rate of the drilling fluid, and the rotary speed and axial force applied to the drill bit. It is generally the case that for any particular mechanical property of a formation, a drill bit's rate of penetration ("ROP") corresponds to the amount of axial force on and the rotary speed of the drill bit. The rate at which the drill bit wears out is generally related to the ROP. Various methods have been developed to optimize various drilling parameters to achieve various desirable results.

Prior art methods for optimizing values for drilling parameters that primarily involve looking at the formation have focused on the compressive strength of the rock being drilled. For example, U.S. Pat. No. 6,346,595, issued to Civolani, et al. ("the '595 patent"), and assigned to the assignee of the present invention, discloses a method of selecting a drill bit design parameter based on the compressive strength of the formation. The compressive strength of the formation may be directly measured by an indentation test performed on drill cuttings in the drilling fluid returns. The method may also be applied to determine the likely optimum drilling parameters such as hydraulic requirements, gauge protection, WOB, and the bit rotation rate. The '595 patent is hereby incorporated by reference in its entirety.

U.S. Pat. No. 6,424,919, issued to Moran, et al. ("the '919 patent"), and assigned to the assignee of the present invention, discloses a method of selecting a drill bit design parameter by inputting at least one property of a formation to be drilled into a trained Artificial Neural Network ("ANN"). The '919 patent also discloses that a trained ANN may be used to determine optimum drilling operating parameters for a selected drill bit design in a formation having particular properties. The ANN may be trained using data obtained from laboratory experimentation or from existing wells that have been drilled near the present well, such as an offset well. The '919 patent is hereby incorporated by reference in its entirety.

ANNs are a relatively new data processing mechanism. ANNs emulate the neuron interconnection architecture of the human brain to mimic the process of human thought. By using empirical pattern recognition, ANNs have been applied in many areas to provide sophisticated data processing solutions to complex and dynamic problems (e.g., classification, diagnosis, decision making, prediction, voice recognition, military target identification).

Similar to the human brain's problem solving process, ANNs use information gained from previous experience and apply that information to new problems and/or situations. The ANN uses a "training experience" (i.e., the data set) to build a system of neural interconnects and weighted links between an input layer (i.e., independent variable), a hidden layer of neural interconnects, and an output layer (i.e., the dependant variables or the results). No existing model or known algorithmic relationship between these variables is required, but such relationships may be used to train the ANN. An initial determination for the output variables in the training exercise is compared with the actual values in a training data set. Differences are back-propagated through the ANN to adjust the weighting of the various neural interconnects, until the differences are reduced to the user's error specification. Due largely to the flexibility of the learning algorithm, non-linear dependencies between the input and output layers, can be "learned" from experience.

Several references disclose various methods for using ANNs to solve various drilling, production, and formation evaluation problems. These references include U.S. Pat. No. 6,044,325 issued to Chakravarthy, et al., U.S. Pat. No. 6,002,985 issued to Stephenson, et al., U.S. Pat. No. 6,021,377 issued to Dubinsky, et al., U.S. Pat. No. 5,730,234 issued to Putot, U.S. Pat. No. 6,012,015 issued to Tubel, and U.S. Pat. No. 5,812,068 issued to Wisler, et al.

However, one skilled in the art will recognize that optimization predictions from these methods may not be as accurate as simulations of drilling, which may be better equipped to make predictions for each unique situation.

Simulation methods have been previously introduced which characterize either the interaction of a bit with the bottom hole surface of a wellbore or the dynamics of BHA.

One simulation method for characterizing interaction between a roller cone bit and an earth formation is described in U.S. Pat. No. 6,516,293 ("the '293 patent"), entitled "Method for Simulating Drilling of Roller Cone Bits and its Application to Roller Cone Bit Design and Performance," and assigned to the assignee of the present invention. The '293 patent discloses methods for predicting cutting element interaction with earth formations. Furthermore, the '293 patent discloses types of experimental tests that can be performed to obtain cutting element/formation interaction data. The '293 patent is hereby incorporated by reference in its entirety. Another simulation method for characterizing cutting element/formation interaction for a roller cone bit is described in Society of Petroleum Engineers (SPE) Paper No. 29922 by D. Ma et al., entitled, "The Computer Simulation of the Interaction Between Roller Bit and Rock".

Methods for optimizing tooth orientation on roller cone bits are disclosed in PCT International Publication No. WO00/12859 entitled, "Force-Balanced Roller-Cone Bits, Systems, Drilling Methods, and Design Methods" and PCT International Publication No. WO00/12860 entitled, "Roller-Cone Bits, Systems, Drilling Methods, and Design Methods with Optimization of Tooth Orientation.

Similarly, SPE Paper No. 15618 by T. M. Warren et al., entitled "Drag Bit Performance Modeling" discloses a method for simulating the performance of PDC bits. Also disclosed are methods for defining the bit geometry and methods for modeling forces on cutting elements and cutting element wear during drilling based on experimental test data. Examples of experimental tests that can be performed to obtain cutting element/earth formation interaction data are also disclosed. Experimental methods that can be performed on bits in earth formations to characterize bit/earth formation interaction are discussed in SPE Paper No. 15617 by T. M. Warren et al., entitled "Laboratory Drilling Performance of PDC Bits".

Present systems for optimizing drilling parameters, as described above, focus on either optimizing drilling components or optimizing drilling conditions. Drilling components may be optimized by tailoring such components for specific well conditions. During such design processes, drill bits, BHAs, drillstrings, and/or drilling tool assemblies may be simulated and adjusted according to the anticipated formation the drilling tool will be drilling. These design processes may involve complex simulations including three dimensional modeling, finite element analysis, and/or graphical representations. Such design processes may require vast amounts of time that, while still in the design and manufacturing stage may be readily available. However, while drilling a wellbore, when downhole conditions change, or when the formation deviates from the anticipated structure, even optimized components may fail or be less efficient than predicted.

During drilling operations, drilling operators may rely on historical data sets, offset well formation data, monitored downhole drilling conditions, and personal experience to anticipate and/or determine when a wellbore condition has changed. A drilling operator may decide to change drilling parameters (e.g., axial load, rotational speed, drilling fluid flow rate, etc.) in response to changing downhole conditions. However, the drilling operator's response may be based on a limited number of options and/or experiences. Alternatively, the drilling operator may research the given conditions, and base a drilling parameter adjustment on such research. However, during drilling, running programs that calculate optimized drilling parameter adjustment are time intensive and may result in substantial rig downtime.

Traditionally, the optimization of drilling components has involved the finite knowledge of a drilling operator when designing and assembling individual drilling components. Examples of such optimization practices may have previously included a drilling operator selecting a drill bit, reamers, spacers, vibration dampeners, and other drilling components based on their individual experience with such devices. The drilling operator, using their own limited experience then assembled such devices according to their experience, and the drilling assembly was used to drill a wellbore. However, more recently, advances in drilling optimization programs have allowed a drilling operators own experience to be supplemented with external experience and historical data. The progression of such optimization programs currently allows a drilling operator to run a simulation of numerous drilling components, as described above, thereby providing for an end product that is further optimized to drill in a specified formation.

Such a computer assisted drilling optimization program may allow an operator to supplement their own knowledge with the knowledge of other drilling assembly designers, experience data from other wells, off set well data, historical bit runs, or data based on simulated drill runs. Using a computer assisted optimization system, the drilling operator may now input known and/or expected formation variables (e.g., formation type), along with their personal experience data (e.g., a starting point for a drilling assembly, including bit type, or desirable drilling components), and allow the computer optimization system to iteratively determine the optimized components of a drilling assembly. Such systems provide for drill assemblies that may be optimized for a given formation, but are still constrained by the experience data of the human operator. Because the computer simulation necessarily begins with the constrained knowledge of the human drilling operator, the iterative process may initially involve many repetitive, and in certain instances needless operations to remove the constraints of the human operator from limiting the optimized drilling assembly.

For example, when a drilling operator beings a simulation of a drilling assembly, the drilling operator may initially provide the computer optimization program formation variable and when they believe to be an optimized drilling assembly. The simulation program then iteratively simulates the preselected drilling assembly a number of times, making small changes in the design of the drilling assembly to optimize such assembly according to the formation variables provided by the human operator. However, in certain instances, the drill bit initially selected by the drilling operator may be substantially not optimized for the selected formation. As such, the computer optimization system begins its simulation based on an incorrect assumption (i.e., the drilling assembly selected by the drilling operator). Because the human operator has supplied incorrect initial constraints to the system, the computer optimization system may either take much time to arrive at an optimized drilling assembly, thereby wasting valuable resources and time or, in certain instances, never arrive at an optimized assembly.

While current computer assisted optimization systems used in designing drilling assemblies may provide for relatively optimized components, because the methods are based on initial human constraints, the systems are inefficient. Thus, there exists a need for a drilling assembly optimization system to guide the design of a drilling assembly to achieve an optimized drilling assembly using a minimum number of simulations. Furthermore, there exists a continuing need for a drill assembly optimization system to control guide adjustments to the drilling assembly throughout the drilling process.

SUMMARY OF THE DISCLOSURE

In one aspect, embodiments disclosed herein relate to a method of optimizing a drilling tool assembly including inputting well data into an optimization system, the optimization system having an experience data set and an artificial neural network. The method further including comparing the well data to the experience data set and developing an initial drilling tool assembly based on the comparing the well data to the experience data, wherein the drilling tool assembly is developed using the artificial neural network. Additionally, the method including simulating the initial drilling tool assembly in the optimization system and creating result data in the optimization system based on the simulating.

In another aspect, embodiments disclosed herein relate to a method of designing a drilling tool assembly including inputting well data into an optimization system, the optimization system including an experience data set and an artificial neural network. The method further including developing an initial drilling tool assembly based on the comparing the well data to the experience data, wherein the initial drilling tool assembly is developed using the artificial neural network, and simulating the drilling assembly in the optimization system. Furthermore, the method includes determining a vibrational signature of the initial drilling tool assembly and adjusting the initial drilling tool assembly based on the vibrational signature to produce an adjusted drilling tool assembly.

Other aspects and advantages of the disclosure will be apparent from the following description and the appended claims.

DETAILED DESCRIPTION

Embodiments disclosed herein are related generally to the field of well drilling. More specifically, embodiments disclosed herein relate to methods of optimizing drilling tool assemblies for use in well drilling operations. More specifically still, embodiments disclosed herein relate to methods of optimizing drilling tool assemblies using artificial neural networks.

The following discussion contains definitions of several specific terms used in this disclosure. These definitions are intended to clarify the meanings of the terms used herein. It is believed that the terms are used in a manner consistent with their ordinary meaning, but the definitions are nonetheless specified here for clarity.

The term "offset well formation information" refers to formation data that is obtained from drilling an offset well in the vicinity of the formation that is being drilled.

The term "historical formation information" refers to formation data that has been obtained prior to the start of drilling for the formation that is being drilled. It may include, for example, information related to a well drilled in the same general area as the current well, information related to a well drilled in a geologically similar area, or seismic or other survey data.

The term "experience data" may refer to data about a particular drilling condition, formation, constraint, or simulation. As such, experience data may include offset well formation information, historical formation information, prior simulation data, and/or other data sources gained from or useful in drilling operations.

The term "drilling parameter" is any parameter that affects the way in which the well is being drilled. For example, the WOB is an important parameter affecting the drilling well. Other drilling parameters include torque-on-bit ("TOB"), rotary speed of the drill bit ("RPM"), and mud flow rate. There are numerous other drilling parameters, as is known in the art, and the term is meant to include any such parameter.

Figure 1:
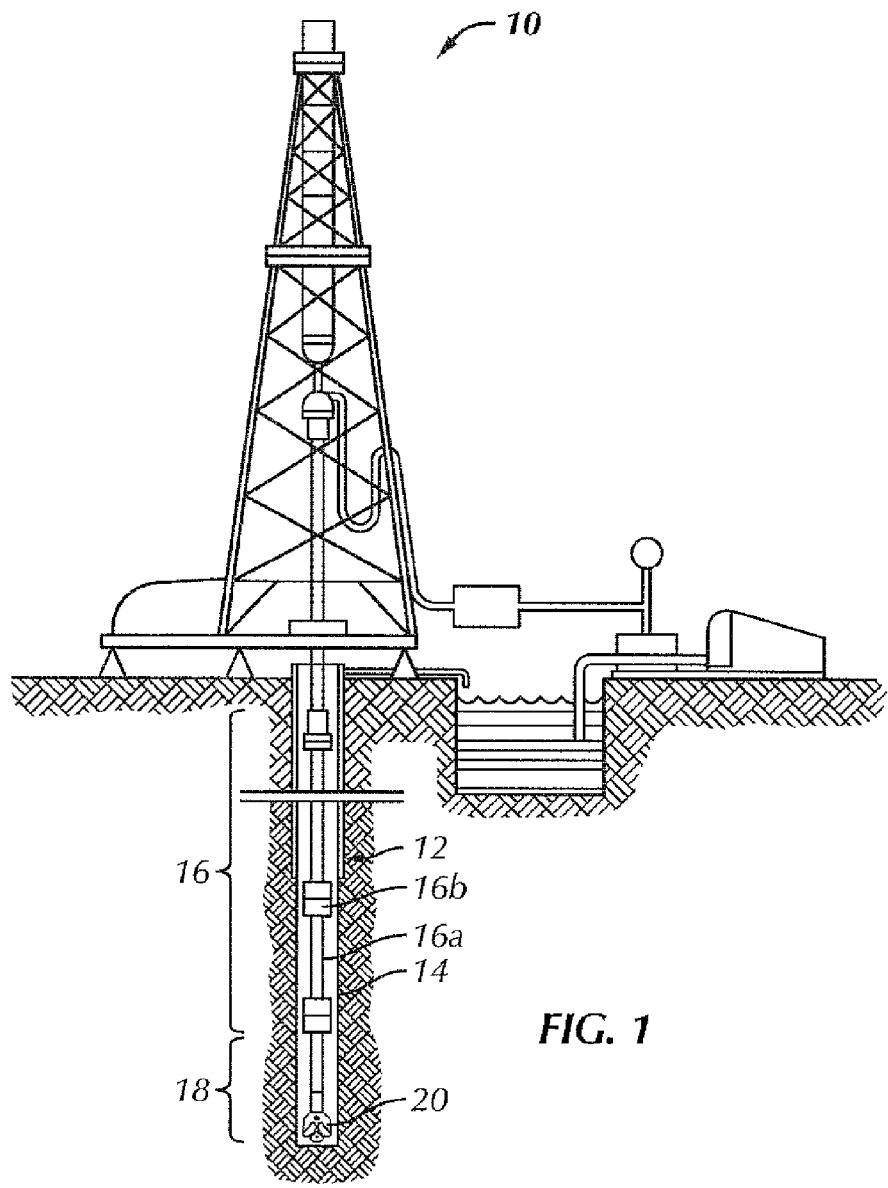
FIG. 1 is an illustration of a drilling system.
Figure 2:
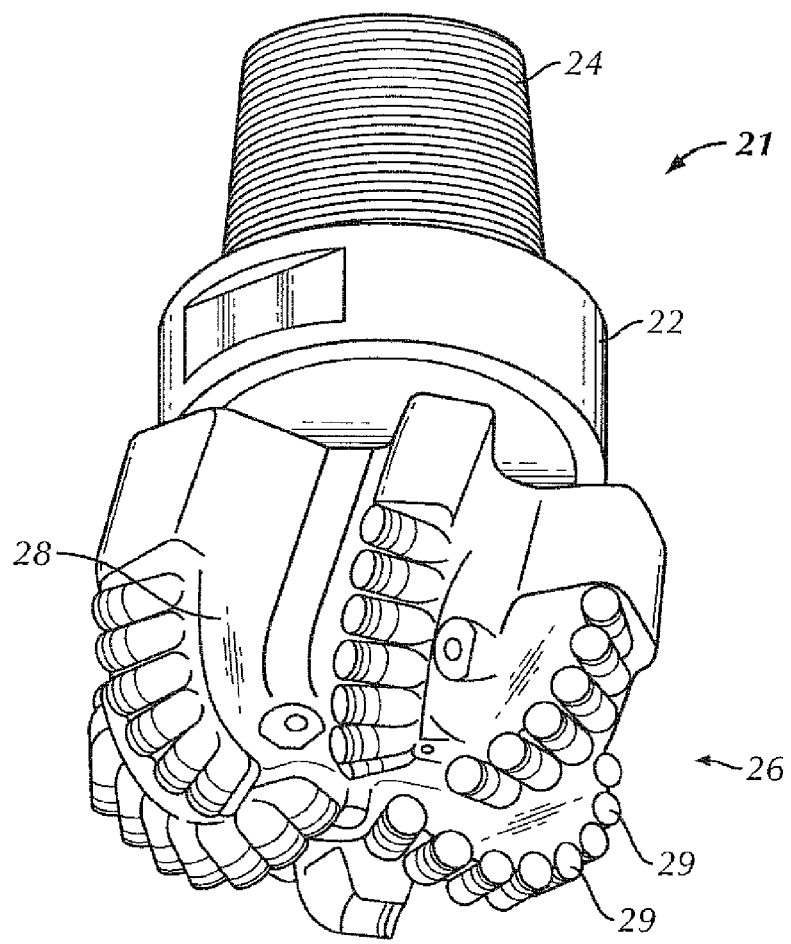
FIG. 2 is a perspective-view drawing of a fixed-cutter bit.
Figure 3:
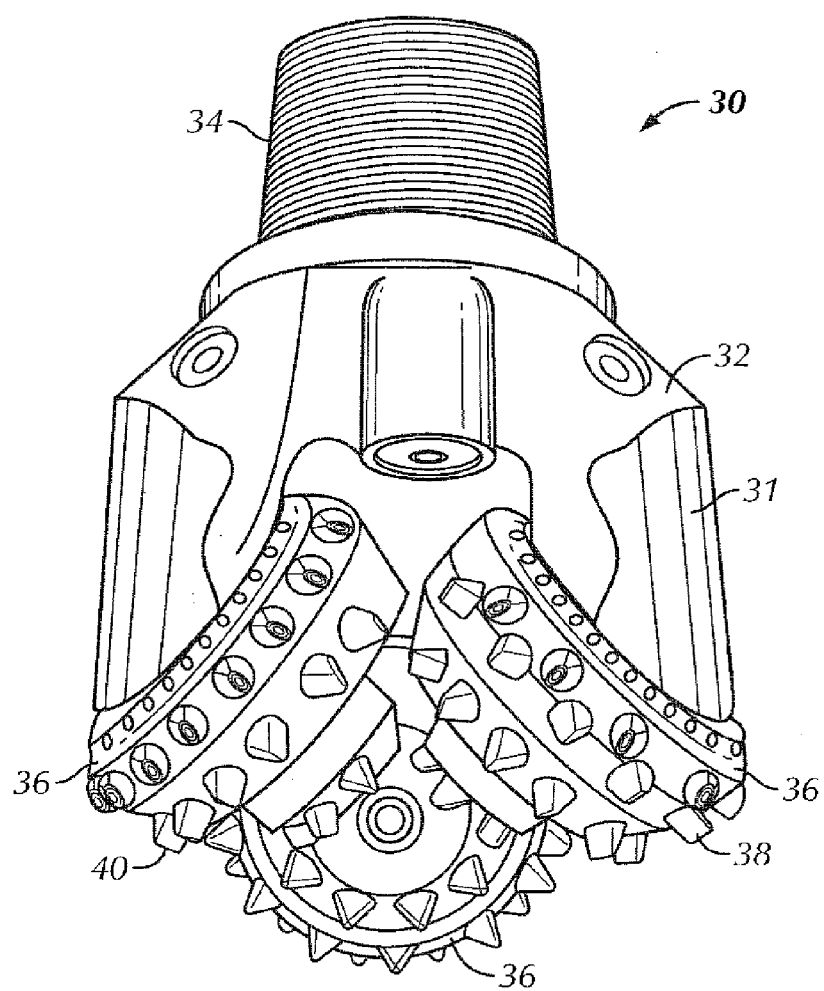
FIG. 3 is a perspective-view drawing of a roller cone bit.
Figure 4A:
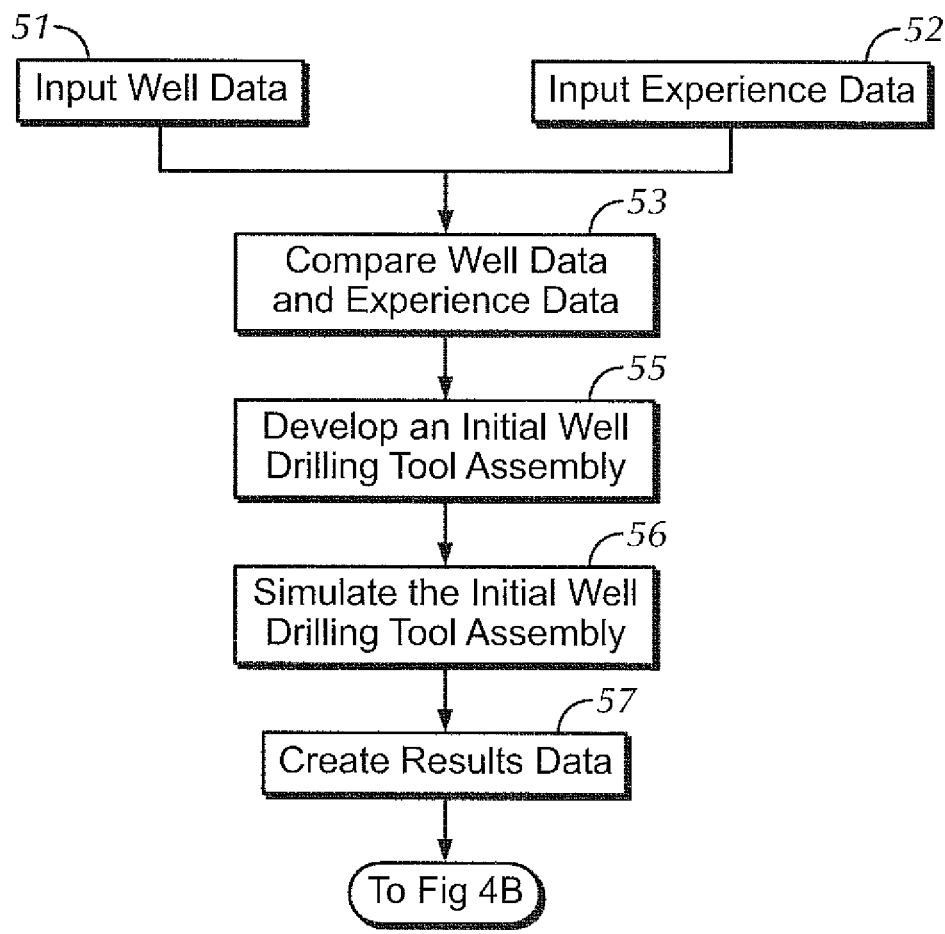
FIG. 4A is a flowchart diagram of a method of designing a drilling tool assembly in accordance with embodiments of the present disclosure.

Referring to FIG. 4A, a flowchart diagram of a method of designing drilling tool assemblies in accordance with embodiments of the present disclosure is shown. Generally, drilling tool assembly design optimization includes altering drilling tool assembly components to produce a drilling tool optimized to perform in a specified formation. Examples of criteria that may be used to measure drilling tool optimization may include, for example, a vibrational signature of a drilling tool assembly, a ROP of a drilling tool assembly, a cutting element wear rate, a dull condition of a drill bit, and other measures of optimization that may be used for a certain drilling operation. In some embodiments, drilling tool optimization may include optimization according to multiple criteria, such that a resultant drilling tool assembly is optimized to produce, for example, a specified vibrational signature and a desirable ROP.

The criteria for determining a drilling tool assembly optimization may be measured according to the preference of a drilling engineer and/or according to the requirements of a drilling operation. As such, specific optimization parameters may vary based on the specificities of the corresponding drilling operation. For example, in an operation where a lowest possible vibrational signature is desirable, a drilling engineer may optimize a drilling tool assembly based on a vibrational signature calculation, as is described below. However, those of ordinary skill in the art will appreciate that in other drilling operations, a drilling engineer may be more concerned with optimizing a drilling tool assembly to produce the highest ROP. In such an embodiment, the drilling tool assembly may be optimized such that the components selected from the drilling tool assembly, as well as corresponding drilling parameters, are adjusted to produce the highest ROP. Additionally, in some embodiments, drilling engineers may desire that a drilling tool assembly is optimized with regard to both achieving a highest possible ROP while maintaining a low vibrational signature. In such embodiments, a drilling optimization system may be instructed to consider multiple parameters when optimizing the drilling tool assembly. Examples of such parameters may include a resultant vibrational signature, a desired ROP, a RPM, a WOB, a TOB, and specific drilling tool assembly components. Those of ordinary skill in the art will appreciate that additional aspects of drilling may also be parameters used to determine optimization, such as, for example, drilling fluids, drilling fluid flow rates, well type, location of drilling assembly components on the drill string, BHA components, and drill string component material properties.

Thus, the drilling tool assembly optimization methods described below are exemplary of how drilling tool assemblies may be designed in accordance with embodiments of the present disclosure. Those of ordinary skill in the art will appreciate that additional methods of optimizing drilling tool assemblies may fall within the scope of the present disclosure, and as such, the disclosure should not be limited by the descriptions illustrated herein.

Referring back to FIG. 4A, in this embodiment, the method of designing drilling tool assembles initially includes inputting well data into an optimization system 51. Well data may include specific formation information known about the drilling location, and/or may also include predicted formation information. Additional examples of well data that may be inputted by a drilling engineer into the optimization system may include known and/or predicted compressive rock strengths of the formation, anticipated wellbore trajectory, and well type.

For example, in the embodiments shown, a drilling engineer may know the compressive strength of the rock type being drilled. Such data may be available from offset wells or regional studies, and may also include predicted data based on field experience and/or surveys. The drilling engineer may also know the type of well being drilled (e.g., vertical, horizontal, or directional), and may know the anticipated depth of the well. Well data such as those listed above, along with additional data as may be known by the drilling engineer, is input into the optimization system 51.

Along with the input of well data, experience data is also input into the optimization system 52. Experience data may include historical bit run data, offset well formation data, and prior simulation data. In certain embodiments, the experience data may also include data compiled from other drilling optimization systems and/or data obtained from drill tool assembly component analysis. Examples of such data may be obtained from stored data from simulated bit runs, drilling tool assembly simulations, drill bit modeling, and/or iterative drilling tool assembly component optimization systems. Those of ordinary skill in the art will appreciate that the experience data set may include multiple sources of data combined from, for examples, the groups of experience data described above.

In certain embodiments, the experience data set may be integral to the optimization system. In such an embodiment, the experience data set may be loaded as part of the optimization system, and the data may be assembled as matrices of searchable data and stored media in the system. Alternatively, the experience data may be loaded into the optimization system from an external source. Examples of such external sources may include data stored on readable media, data imported from a remote data store, or data otherwise uploaded from a remote location. Those of ordinary skill in the art will appreciate that experience data may be uploaded as additional data sources become available. Thus, the experience data of the optimization system may be dynamically upgradeable.

In one aspect, such an upgradeable system may include an integral data store to save iterative simulations of the drilling tool assembly. In such a system, every simulation used in optimizing the drilling tool assembly may be incorporated into the experience data. Thus, each iteration of the drilling tool assembly would dynamically increase the experience data set, thereby expanding the robustness of the system. However, those of ordinary skill in the art will appreciate that in addition to locally processed iterative simulations, in certain embodiments, the optimization system may be remotely connected to other optimization systems. In such embodiments, the system may be dynamically upgradeable across a network including multiple optimization systems.

In some embodiments, experience data sets may also include data previously analyzed using ANNs. In such an embodiment, historical bit runs and previously simulated drilling tool assembly data may have been previously analyzed by an ANN, and organized into matrices weighing in the interconnect between, for example, a specific formation property and the success of a drilling tool assembly in that formation. Thus, the experience data may include data sets that include associated data representing a probability of results if a specified drilling tool assembly component is used in a specified formation according to specified drilling parameters. Because such associations are already included in the experience data sets, the optimization system may more efficiently generate an optimized drilling assembly.

In other embodiments, the experience data may be partially analyzed using an ANN; however, additional processing may be required to further develop the series of neural interconnects and weighed links between input and output variables. For example, an experience data set may include data that has associated a formation, a drilling tool assembly, and a vibrational signature. However, the experience data set may not have been previously associated with corresponding ROP. Thus, using the established interconnects found in other data included in the experience data set, the optimization system may further process the experience data to produce a more robust model associating a formation, a drilling tool assembly, a vibrational signature, and/or an ROP. Such an embodiment may thereby allow the optimization system to generate an optimized drilling tool assembly with increased efficiency. Those of ordinary skill in the art will appreciate that in certain embodiments, the additional data sets may be modified and updated by an included ANN.

Accordingly, the optimization system of the present disclosure includes both an experience data set, as described above, and an ANN. The ANN is configured to receive instructions from a drilling engineer that include at least well data, as described above, and has access to experience data sets. After receiving the well data, the ANN may compare the well data with the experience data sets 53 and develop an initial drilling assembly 55. Because the ANN has access to the experience data, when the ANN selects components for an initial drilling assembly, the initial drilling assembly developed may be based on the neural interconnects weighing related inputs and outputs.

For example, a drilling engineer may input well data 51 including drilling assembly components that are required to be in the assembly, a list of available alternate components, and in certain aspects, a starting assembly position for the initial simulation. The optimization system then compares the well data with the experience data 53 using the ANN, and develops an initial drilling tool assembly to guide the optimization process 55. The initial drilling assembly is the simulated by the optimization system 56, creating result data 57 that may be displayed to the drill engineer or used by the optimization system in further simulations. The initial determination of the ANN may be used to add components to the drilling tool assembly, remove components from the drilling tool assembly, or move components on the drilling tool assembly to achieve an optimized condition. The condition, as described above, may include, for example, a vibrational signature, ROP, dull grade, or wear rate. Thus, in one embodiment, the ANN may determine optimized positions of drilling tool assembly components on the drill string to, for example, reduce a vibrational signature of the drilling tool assembly. However, in another embodiment, the ANN may iteratively simulate the drilling tool assembly to optimize not only the placement of components, but also the addition or removal of such components. Additionally, the ANN may be used to further analyze and determine optimal drilling assembly components for specific drilling parameters. Thus, the ANN driven optimization system may optimize a drilling assembly for a specific drilling operation, and provide suggested drilling parameters for use therein. Furthermore, the ANN driven optimization system may generate and or incorporate drilling parameter ranges for predicting how a drilling tool assembly my drill in, for example, a specified formation. Because the optimization system may incorporate prior data into its optimizations, the optimization of a drilling tool assembly may further include optimized drilling parameters to be used with the optimized drilling tool assembly. Thus, the optimization system may provide a tool for optimizing the drilling operation by optimizing the drilling tool assembly, the drilling parameters, and provide for parameter adjustments to be used during actual drilling.

Because the ANN determines an initial drilling tool assembly, whether the determination is placement of drilling components on the drill string or a determination of which components to use, and because the ANN has access to experience data, the initial drilling tool assembly may be relatively closer in design to the optimized drilling tool assembly. Thus, the number of iterative simulations may be decreased, and an optimized drilling tool assembly thereby designed in less time.

Figure 4B:
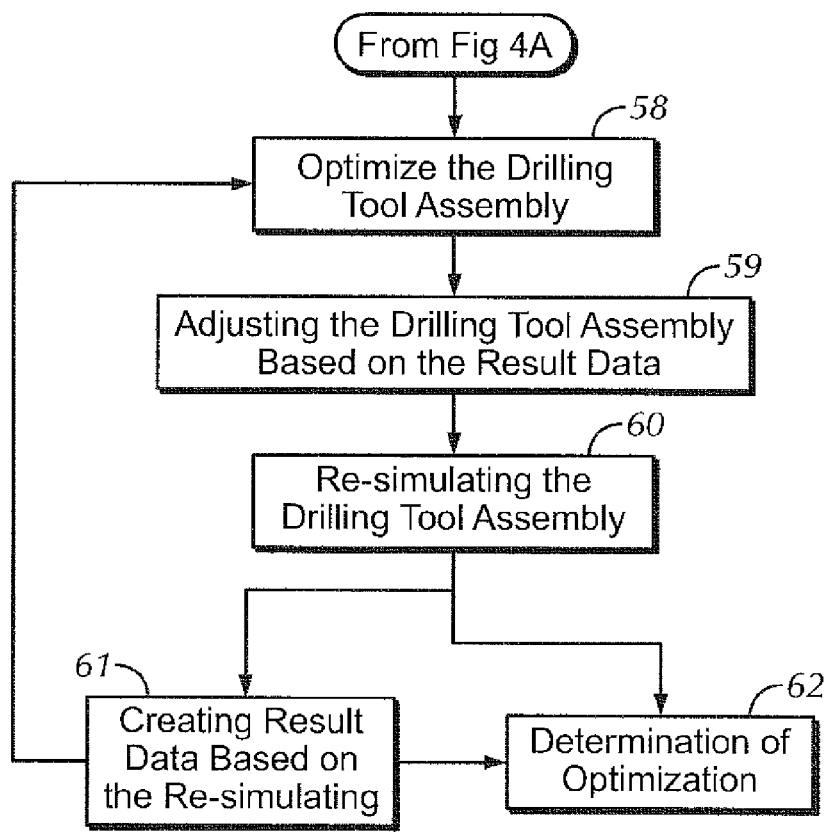
FIG. 4B is a flowchart diagram of a method of optimizing drilling tool assemblies according to the method of FIG. 4B in accordance with embodiments of the present disclosure.

Referring now to FIG. 4B, a flowchart diagram of a method of designing drilling tool assemblies in accordance with embodiments of the present disclosure is shown. In this embodiment, the results data that is created in a first simulation (57 of FIG. 4A) may then be used by an optimization system to optimize the drilling tool assembly 58. Optimization of a drilling tool assembly generally includes using results data, that may include the results of an initial simulation, results of a comparison of experience data with well data, or an output of an ANN (e.g., an initial drilling tool assembly design created) as a starting point for an optimization loop. The optimization system, after running a simulation (e.g., 52 of FIG. 4A), adjusts the drilling tool assembly based on the results data 59. Such adjustments may include, for example, re-positioning of a component of the drilling tool assembly, addition of a component, or adjustment of a drilling parameter. The adjusted drilling tool assembly is then re-simulated 60, and additional results data is created 61.

After adjustment of the drilling tool assembly according to the results data 61, the optimization system may then either begin a new optimization loop at 58, which may include additional iterative simulations, or the optimization system may determine that appropriate optimization has occurred 62. Such a determination of optimization may be based on reaching an acceptable or required drilling tool assembly parameter, drilling parameter, or desired outcome, such as a specified vibration signature for the drilling tool assembly. Alternatively, a drilling engineer may determine that the drilling tool is sufficiently optimized and terminate the optimization. In still other embodiments, the optimization system may be programmed to perform a set number of simulations, and accept the results as a sufficiently optimized drilling tool assembly, unless otherwise instructed by the drilling engineer. Because the optimization system may be programmatically driven by an ANN, the number of simulations required to reach an optimized drilling tool assembly condition may be substantially decreased. Furthermore, because the ANN driven optimization system becomes more robust with each iteration, subsequent drilling tool assembly design operations may also become more efficient, as will be described in detail below.

Those of ordinary skill in the art will appreciate that additional components and aspects of the above described general optimization system and methods are within the scope of the present disclosure. Specific aspects, embodiments, and examples of embodiments of the present disclosure are discussed in detail below.

Method of Training an Artificial Neural Network

In certain embodiments, training an ANN prior to drilling tool assembly optimization may further increase the neural base of the ANN, and thereby result in a more efficient optimization. Those of ordinary skill in the art will appreciate that ANN training, as described below, is one method for training an ANN, including training an ANN for optimization of a vibrational signature. As such, alternatively trained ANNs, or ANNs trained in the optimization of multiple components or results of a drilling tool assembly may be used in the optimization system.

In general, training an ANN includes providing the ANN with a training data set. A training data set includes known input variables and known output variables that correspond to the input variables. The ANN then builds a series of neural interconnects and weighted links between the input variables and the output variables. Using this training experience, an ANN may then predict output variables values based on a set of input variables.

To train the ANN to determine formation properties, a training data set may include known input variables (representing well data, e.g., previously acquired data) and known output variables (representing the formation properties corresponding to the well data). After training, the ANN may be used to determine unknown formation properties based on measured well data. For example, raw current well data may be input to a computer with a trained ANN. Then, using the trained ANN and the current well data, the computer may output estimations of the formation properties.

Additionally, training an ANN in accordance with the present disclosure may include providing the ANN with experience data. Thus, in one embodiment, data collected may be preserved and input into an ANN training program. An ANN training program may serve as a collection location for different types of experience data, such as, for example, historical bit run data, optimized bit/BHA studies, optimized drill string/tool assembly studies, and other studies as are known by those of ordinary skill in the art. The ANN training program may assemble such data sources, and develop secondary ANNs that may be used to analyze specific components of a drilling operation.

Figure 5:
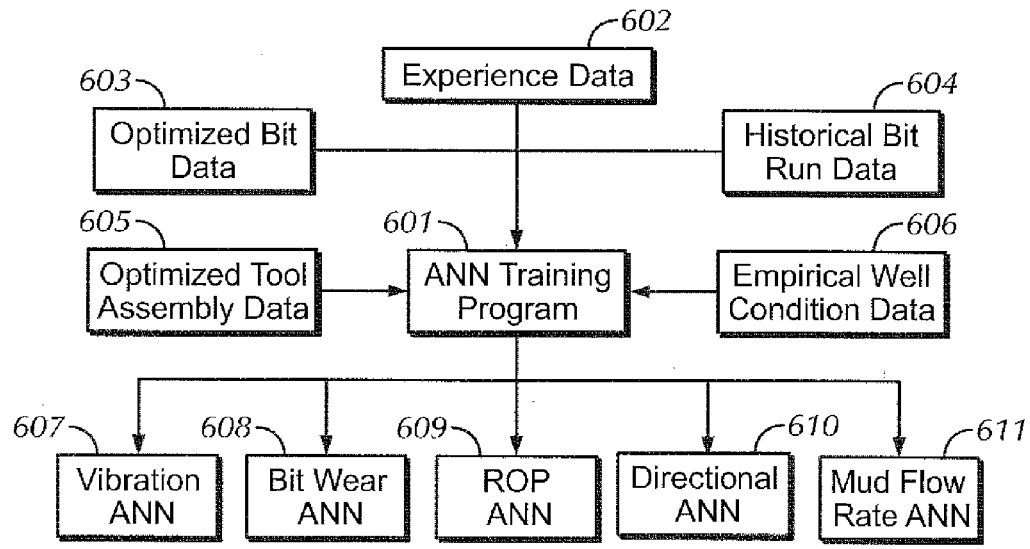
FIG. 5 is a flowchart diagram of a method of training an artificial neural network in accordance with embodiments of the present disclosure.

Referring to FIG. 5, a flowchart diagram of a method of training an ANN in accordance with an embodiment of the present disclosure is shown. In one embodiment, an ANN training program 601 may collect and process data from a number of different sources including, experience data 602, optimized bit data 603, historical bit run data 604, optimized tool assembly data 605, and empirical well condition data 606. Training ANN 601 may collect data from any of the above mentioned sources, process the data, and produce a trained ANN targeting a specific tool assembly or wellbore condition. Examples of such trained ANNs may include, a vibrational ANN 607, a bit wear ANN 608, a ROP ANN 609, a directional ANN 610 and/or a mud flow rate ANN 611.

Predicting the drilling tool assembly parameters may be accomplished using a trained ANN. In such embodiments, the ANN may be trained using a training data set that includes the experience data and the correlation of well data to offset well data as the inputs and drilling tool assembly parameters and vibrational signatures as the outputs. Using the training data set, the ANN may build a series of neural interconnects and weighted links between the input variables and the output variables. Using this training experience, an ANN may then predict vibrational responses for a drilling tool assembly based on inputs of experience data or the offset well data and the correlation of the current well data to the experience data.

As mentioned above, one such type of trained ANN may include a vibrational analysis ANN 607. Such an ANN may be useful in analyzing a drilling tool assembly during tool design. Methods for dynamically simulating cutting tool and bit vibrations are disclosed in U.S. Patent Publication No. 2005/0273302, titled Dynamically Balanced Cutting Tool System, assigned to the assignee of the present invention, and incorporated by reference herein in its entirety. Such calculations and processes necessary for the simulation of cutting tool and bit vibrations may be performed during the training of vibrational ANN 607, so that vibrational ANN 607 includes a database of stored drilling conditions and drilling parameters affecting the conditions contained therein.

Figure 6:
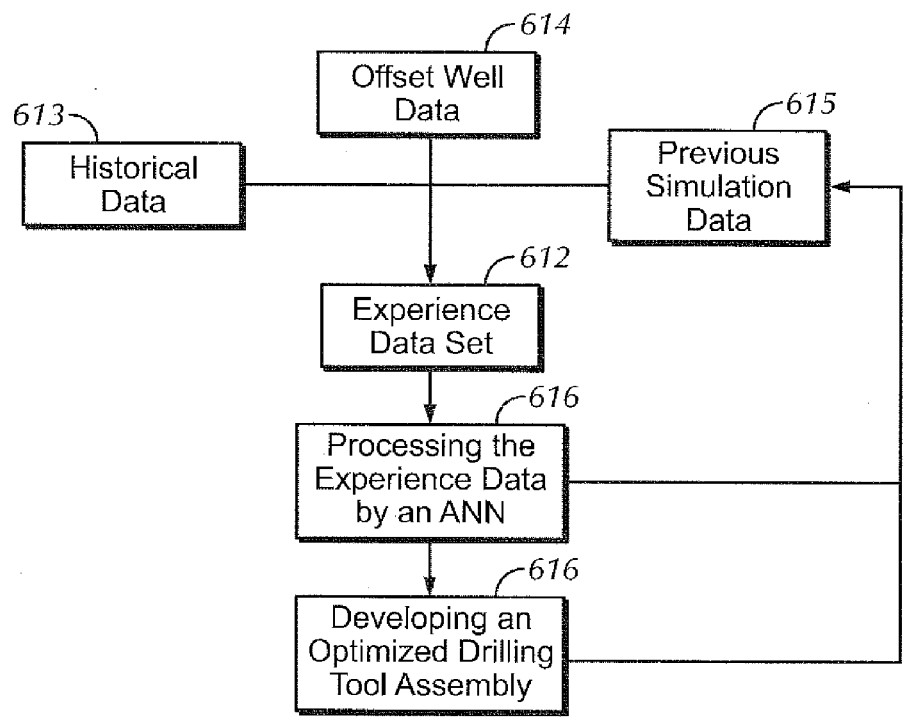
FIG. 6 is a flowchart diagram of a method of loading experience data into a drilling tool assembly optimization system in accordance with embodiments of the present disclosure.

After vibrational ANN 607 is trained using experience data, as described above, the ANN may be continuously trained during subsequent simulations. Referring now to FIG. 6, a flowchart diagram of ANN training based on simulation data according to one embodiment of the present disclosure is shown. After a vibrational ANN is trained using experience data 612, historical data 613, offset well data 614, and previously acquired simulation data 615, as described above, the ANN may be continuously trained during subsequent simulations. Additionally, those of ordinary skill in the art will appreciate that experience data 612 may include historical data, offset well data, and previous simulation data not independently input into the ANN or another aspect of the optimization system.

In this embodiment, the neural interconnects created in the ANN during processing of the experience data 616 may allow the ANN to more efficiently process substantive data sets, including subsequent simulations and initial drilling tool assembly designs. Furthermore, as an optimized drilling tool assembly is developed 617, the outcomes of the simulation, adjusting and optimization may be input into and used as previous simulation data 615. Thus, each iterative simulation of the optimization system, including each process of the ANN, may increase the efficiency of the optimization process, because such simulation data may be saved and used in subsequent iterations or optimization processes.

Those or ordinary skill in the art will appreciate that the neural interconnects established by processing experience data 616 and optimizing the drilling tool assembly 617 may be stored either locally, or in a remote data store, to be accessed and/or used by other ANNs and/or optimization systems. Furthermore, an optimization system that includes multiple ANNs may use the previous simulation data as additional data input into secondary ANNs during ANN training.

In the systems described above, because the ANN is trained in previous simulations, the ANN may be used to guide resulting simulation processes to achieve a desired condition (e.g., a specified vibrational signature). Thus, the iterations in the simulation are controlled by the ANN, such that fewer simulations are required to reach the desired condition. An ANN guided optimization system may thereby require fewer simulations, less external data input, and less human interaction when processing data in drilling tool assembly operations.

Those of ordinary skill in the art will appreciate that ANN guided optimization may be driven by a single ANN or a plurality of ANNs networked together, operating in series to determine one optimized drilling assembly parameter, or in parallel to determine multiple optimized drilling assembly parameters. Furthermore, the ANN guided optimization may be used in multiple methods of simulating drilling tool assemblies, such that the optimization system determines optimized drilling tool assembly parameters, optimized drilling parameters, or other optimized properties of a drilling operation that may effect, for example, a vibration signature, a wear rate, a dull condition, or another property that effects the drilling operation. One example of a method of simulating a drilling tool assembly in accordance with embodiments disclosed herein is described in detail below.

Method of Simulating a Drilling Tool Assembly

Those of ordinary skill in the art will appreciate that optimizing a drilling tool assembly involves an iterative process of simulating and adjusting parameters of the drilling tool assembly according to result data generated during a prior simulation. The method of simulating a drilling tool assembly described below is illustrative of how an iterative simulation may occur. Additional aspects of simulation, such as additional constraints to drilling parameters, drilling tool assembly parameters, or data available during the simulation may further increase the efficiency of the system.

Identifying design parameters for use in a drilling tool assembly may include the identification, simulation, and adjustment of components of, among other things, a drill string, drill bit, and/or BHA. The below described methods for identifying such design parameters for drill bits, drill strings, and/or BHAs may include examples of experience data, as described above, that may be used in accordance with embodiments of the present disclosure. Further more, multiple optimization systems incorporating methods for drill bit, drill string, and/or BHA design optimization may be combined as multiple nodes of experience data for use in training, for example, ANNs. Thus, one of ordinary skill in the art will appreciate that the method for simulating a drilling tool assembly described below is merely one method that may be used in simulating a drilling tool assembly.

In one aspect, the present disclosure provides a method for simulating the dynamic response of a drilling tool assembly drilling earth formation. Advantageously, this method takes into account interaction between the entire drilling tool assembly and the drilling environment. Interaction between the drilling tool assembly and the drilling environment may include interaction between the drill bit at the end of the drilling tool assembly and the formation at the bottom of the wellbore. Interaction between the drilling tool assembly and the drilling environment also may include interaction between the drilling tool assembly and the side (or wall) of the wellbore. Further, interaction between the drilling tool assembly and drilling environment may include viscous damping effects of the drilling fluid on the dynamic response of the drilling tool assembly.

Figure 7:
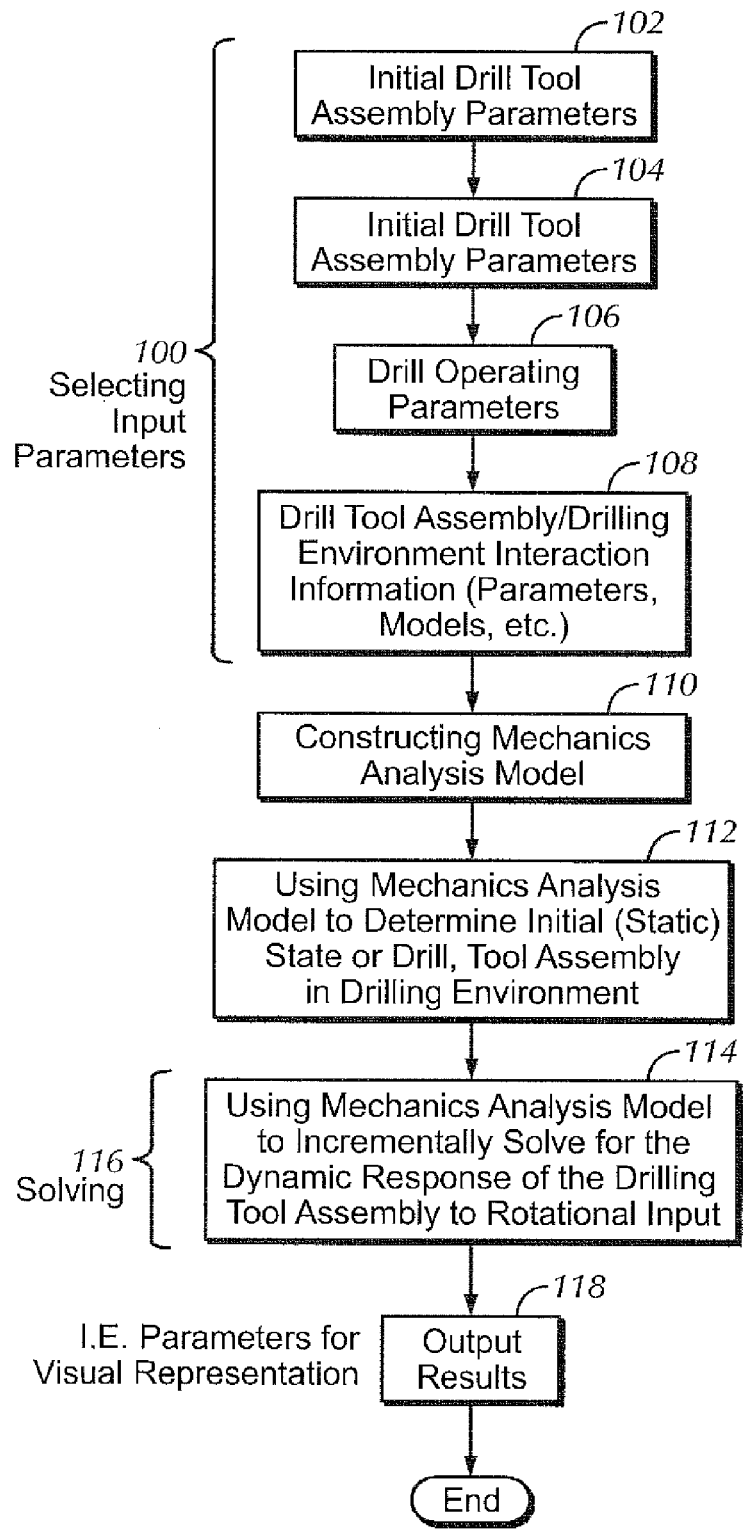
FIG. 7 is a flowchart diagram of a method of designing drilling tool assemblies in accordance with embodiments of the present disclosure.

A flow chart for one embodiment of the invention is illustrated in FIG. 7. The first step in this embodiment is selecting (defining or otherwise providing) parameters 100, including initial drilling tool assembly parameters 102, initial drilling environment parameters 104, drilling operating parameters 106, and drilling tool assembly/drilling environment interaction information (parameters and/or models) 108. The next step involves constructing a mechanics analysis model of the drilling tool assembly 110. The mechanics analysis model can be constructed using the drilling tool assembly parameters 102 and Newton's law of motion. The next step involves determining an initial static state of the drilling tool assembly 112 in the selected drilling environment using the mechanics analysis model 110 along with drilling environment parameters 104 and drilling tool assembly/drilling environment interaction information 108. Once the mechanics analysis model is constructed and an initial static state of the drill string is determined, the resulting static state parameters can be used with the drilling operating parameters 106 to incrementally solve for the dynamic response 114 of the drilling tool assembly 50 to rotational input from the rotary table 64 and the hook load provided at the hook 62. Once a simulated response for an increment in time (or for the total time) is obtained, results from the simulation can be provided as output 118, and used to generate a visual representation of drilling if desired.

Figure 8:
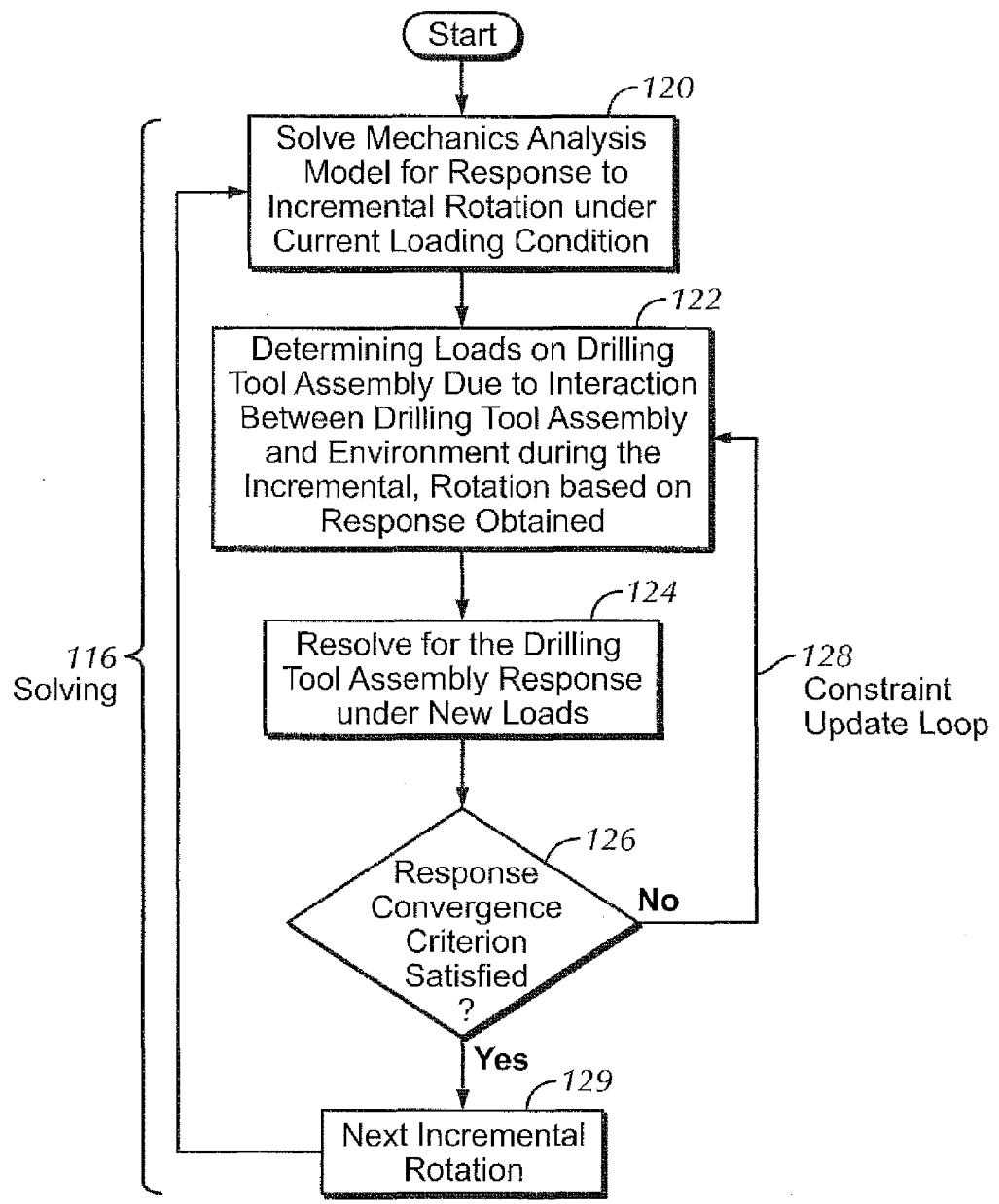
FIG. 8 is a flowchart diagram of a method of storing drilling tool assembly result data in accordance with embodiments of the present disclosure.

In one example, illustrated in FIG. 8, incrementally solving for the dynamic response (indicated as 116) may not only include solving the mechanics analysis model for the dynamic response to an incremental rotation, at 120, but may also include determining, from the response obtained, loads (e.g., drilling environment interaction forces) on the drilling tool assembly due to interaction between the drilling tool assembly and the drilling environment during the incremental rotation, at 122, and resolving for the response of the drilling tool assembly to the incremental rotation, at 124, under the newly determined loads. The determining and resolving may be repeated in a constraint update loop 128 until a response convergence criterion 126 is satisfied. Once a convergence criterion is satisfied, the entire incremental solving process 116 may be repeated for successive increments until an end condition for simulation is reached.

For the example shown in FIGS. 9A-D, the parameters provided as input 200 include drilling tool assembly design parameters 202, initial drilling environment parameters 204, drilling operating parameters 206, and drilling tool assembly/drilling environment interaction parameters and/or models 208.

Drilling tool assembly design parameters 202 may include drill string design parameters, BHA design parameters, and drill bit design parameters. In the example shown, the drill string comprises a plurality of joints of drill pipe, and the BHA comprises drill collars, stabilizers, bent housings, and other downhole tools (e.g., MWD tools, LWD tools, downhole motor, etc.), and a drill bit. As noted above, while the drill bit, generally, is considered a part of the BHA, in this example the design parameters of the drill bit are shown separately to illustrate that any type of drill bit may be defined and modeled using any drill bit analysis model.

Drill string design parameters include, for example, the length, inside diameter (ID), outside diameter (OD), weight (or density), and other material properties of the drill string in the aggregate. Alternatively, drill string design parameters may include the properties of each component of the drill string and the number of components and location of each component of the drill string. For example, the length, ID, OD, weight, and material properties of one joint of drill pipe may be provided along with the number of joints of drill pipe which make up the drill string. Material properties used may include the type of material and/or the strength, elasticity, and density of the material. The weight of the drill string, or individual components of the drill string, may be provided as "weight in drilling fluids" (the weight of the component when submerged in the selected drilling fluid).

BHA design parameters include, for example, the bent angle and orientation of the motor, the length, equivalent inside diameter (ID), outside diameter (OD), weight (or density), and other material properties of each of the various components of the BHA. In this example, the drill collars, stabilizers, and other downhole tools are defined by their lengths, equivalent IDs, ODs, material properties, weight in drilling fluids, and position in the drilling tool assembly.

The drill bit design parameters include, for example, the bit type (roller cone, fixed-cutter, etc.) and geometric parameters of the bit. Geometric parameters of the bit may include the bit size (e.g., diameter), number of cutting elements, and the location, shape, size, and orientation of the cutting elements. In the case of a roller cone bit, drill bit design parameters may further include cone profiles, cone axis offset (offset from perpendicular with the bit axis of rotation), the number of cutting elements on each cone, the location, size, shape, orientation, etc. of each cutting element on each cone, and any other bit geometric parameters (e.g., journal angles, element spacing, etc.) to completely define the bit geometry. In general, bit, cutting element, and cone geometry may be converted to coordinates and provided as input. One preferred method for obtaining bit design parameters is the use of 3-dimensional CAD solid or surface models to facilitate geometric input. Drill bit design parameters may further include material properties, such as strength, hardness, etc., of components of the bit.

Initial drilling environment parameters 204 include, for example, wellbore parameters. Wellbore parameters may include wellbore trajectory (or geometric) parameters and wellbore formation parameters. Wellbore trajectory parameters may include an initial wellbore measured depth (or length), wellbore diameter, inclination angle, and azimuth direction of the wellbore trajectory. In the typical case of a wellbore comprising segments having different diameters or differing in direction, the wellbore trajectory information may include depths, diameters, inclination angles, and azimuth directions for each of the various segments. Wellbore trajectory information may further include an indication of the curvature of the segments (which may be used to determine the order of mathematical equations used to represent each segment). Wellbore formation parameters may include the type of formation being drilled and/or material properties of the formation such as the formation strength, hardness, plasticity, and elastic modulus.

Drilling operating parameters 206, in this embodiment, include the rotary table speed at which the drilling tool assembly is rotated (RPM), the downhole motor speed if a downhole motor is included, and the hook load. Drilling operating parameters 206 may further include drilling fluid parameters, such as the viscosity and density of the drilling fluid, for example. It should be understood that drilling operating parameters 206 are not limited to these variables. In other embodiments, drilling operating parameters 206 may include other variables, such as, for example, rotary torque and drilling fluid flow rate. Additionally, drilling operating parameters 206 for the purpose of simulation may further include the total number of bit revolutions to be simulated or the total drilling time desired for simulation. However, it should be understood that total revolutions and total drilling time are simply end conditions that can be provided as input to control the stopping point of simulation, and are not necessary for the calculation required for simulation. Additionally, in other embodiments, other end conditions may be provided, such as total drilling depth to be simulated, or by operator command, for example.

Drilling tool assembly/drilling environment interaction information 208 includes, for example, cutting element/earth formation interaction models (or parameters) and drilling tool assembly/formation impact, friction, and damping models and/or parameters. Cutting element/earth formation interaction models may include vertical force-penetration relations and/or parameters which characterize the relationship between the axial force of a selected cutting element on a selected formation and the corresponding penetration of the cutting element into the formation. Cutting element/earth formation interaction models may also include lateral force-scraping relations and/or parameters which characterize the relationship between the lateral force of a selected cutting element on a selected formation and the corresponding scraping of the formation by the cutting element. Cutting element/ formation interaction models may also include brittle fracture crater models and/or parameters for predicting formation craters which will likely result in brittle fracture, wear models and/or parameters for predicting cutting element wear resulting from contact with the formation, and cone shell/formation or bit body/formation interaction models and/or parameters for determining forces on the bit resulting from cone shell/ formation or bit body/formation interaction. One example of methods for obtaining or determining drilling tool assembly/ formation interaction models or parameters can be found in U.S. Pat. No. 6,516,293, assigned to the assignee of the present invention and incorporated herein by reference. Other methods for modeling drill bit interaction with a formation can be found in the previously noted SPE Papers No. 29922, No. 15617, and No. 15618, and PCT International Publication Nos. WO 00/12859 and WO 00/12860.

Drilling tool assembly/formation impact, friction, and damping models and/or parameters characterize impact and friction on the drilling tool assembly due to contact with the wall of the wellbore and the viscous damping effects of the drilling fluid. These models/parameters include, for example, drill string-BHA/formation impact models and/or parameters, bit body/formation impact models and/or parameters, drill string-BHA/formation friction models and/or parameters, and drilling fluid viscous damping models and/or parameters. One skilled in the art will appreciate that impact, friction and damping models/parameters may be obtained through laboratory experimentation, in a method similar to that disclosed in the prior art for drill bits interaction models/ parameters. Alternatively, these models may also be derived based on mechanical properties of the formation and the drilling tool assembly, or may be obtained from literature. Prior art methods for determining impact and friction models are shown, for example, in papers such as the one by Yu Wang and Matthew Mason, entitled "Two-Dimensional Rigid-Body Collisions with Friction", *Journal of Applied Mechanics*, September 1992, Vol. 59, pp. 635-642.

As shown in FIGS. 9A-D, once input parameters/models 200 are selected, determined, or otherwise provided, a two-part mechanics analysis model of the drilling tool assembly is constructed and used to determine the initial static state (at 232) of the drilling tool assembly in the wellbore. The first part of the mechanics analysis model takes into consideration the overall structure of the drilling tool assembly, with the drill bit being only generally represented. In this embodiment, for example, a finite element method is used (generally described at 212) wherein an arbitrary initial state (such as hanging in the vertical mode free of bending stresses) is defined for the drilling tool assembly as a reference and the drilling tool assembly is divided into N elements of specified element lengths (i.e., meshed). The static load vector for each element due to gravity is calculated. Then element stiffness matrices are constructed based on the material properties (e.g., elasticity), element length, and cross sectional geometrical properties of drilling tool assembly components provided as input and are used to construct a stiffness matrix, at 212, for the entire drilling tool assembly (wherein the drill bit is generally represented by a single node). Similarly, element mass matrices are constructed by determining the mass of each element (based on material properties, etc.) and are used to construct a mass matrix, at 214, for the entire drilling tool assembly. Additionally, element damping matrices can be constructed (based on experimental data, approximation, or other method) and used to construct a damping matrix, at 216, for the entire drilling tool assembly. Methods for dividing a system into finite elements and constructing corresponding stiffness, mass, and damping matrices are known in the art and thus are not explained in detail here. Examples of such methods are shown, for example, in "Finite Elements for Analysis and Design" by J. E. Akin (Academic Press, 1994).

The second part of the mechanics analysis model of the drilling tool assembly is a mechanics analysis model of the drill bit which takes into account details of selected drill bit design. The drill bit mechanics analysis model is constructed by creating a mesh of the cutting elements and cones (for a roller cone bit) of the bit, and establishing a coordinate relationship (coordinate system transformation) between the cutting elements and the cones, between the cones and the bit, and between the bit and the tip of the BHA. As previously noted, examples of methods for constructing mechanics analysis models for roller cone drill bits can be found in U.S. Pat. No. 6,516,293, as well as SPE Paper No. 29922, and PCT International Publication Nos. WO 00/12859 and WO 00/12860, noted above.

Because the response of the drilling tool assembly is subject to the constraint within the wellbore, wellbore constraints for the drilling tool assembly are determined, at 222, 224. First, the trajectory of the wall of the wellbore, which constrains the drilling tool assembly and forces it to conform to the wellbore path, is constructed at 220 using wellbore trajectory parameters provided as input at 204. For example, a cubic B-spline method or other interpolation method can be used to approximate wellbore wall coordinates at depths between the depths provided as input data. The wall coordinates are then discretized (or meshed), at 224 and stored. Similarly, an initial wellbore bottom surface geometry, which is either selected or determined, may also be discretized, at 222, and stored. The initial bottom surface of the wellbore may be selected as flat or as any other contour, which may be provided as wellbore input at 204 or 222. Alternatively, the initial bottom surface geometry may be generated or approximated based on the selected bit geometry. For example, the initial bottomhole geometry may be selected from a "library" (i.e., database) containing stored bottomhole geometries resulting from the use of various bits.

In this embodiment, a coordinate mesh size of 1 millimeter is selected for the wellbore surfaces (wall and bottomhole); however, the coordinate mesh size is not intended to be a limitation on the invention. Once meshed and stored, the wellbore wall and bottomhole geometry, together, comprise the initial wellbore constraints within which the drilling tool assembly must operate, thus, within which the drilling tool assembly response must be constrained.

As shown in FIGS. 9A-D, once the (two-part) mechanics analysis model for the drilling tool assembly is constructed (using Newton's second law) and the wellbore constraints are specified 222, 224, the mechanics model and constraints can be used to determine the constraint forces on the drilling tool assembly when forced to the wellbore trajectory and bottomhole from its original "stress free" state. In this embodiment, the constraint forces on the drilling tool assembly are determined by first displacing and fixing the nodes of the drilling tool assembly so the centerline of the drilling tool assembly corresponds to the centerline of the wellbore, at 226. Then, the corresponding constraining forces required on each node (to fix it in this position) are calculated at 228 from the fixed nodal displacements using the drilling tool assembly (i.e., system or global) stiffness matrix from 212. Once the "centerline" constraining forces are determined, the hook load is specified, and initial wellbore wall constraints and bottomhole constraints are introduced at 230 along the drilling tool assembly and at the bit (lowest node). The centerline constraints are used as the wellbore wall constraints. The hook load and gravitational force vector are used to determine the WOB.

As previously noted, the hook load is the load measured at the hook from which the drilling tool assembly is suspended. Because the weight of the drilling tool assembly is known, the bottomhole constraint force (i.e., WOB) can be determined as the weight of the drilling tool assembly minus the hook load and the frictional forces and reaction forces of the hole wall on the drilling tool assembly.

Once the initial loading conditions are introduced, the "centerline" constraint forces on all of the nodes are removed, a gravitational force vector is applied, and the static equilibrium position of the assembly within the wellbore is determined by iteratively calculating the static state of the drilling tool assembly 232. Iterations are necessary because the contact points for each iteration may be different. The convergent static equilibrium state is reached and the iteration process ends when the contact points and, hence, contact forces are substantially the same for two successive iterations. Along with the static equilibrium position, the contact points, contact forces, friction forces, and static WOB on the drilling tool assembly are determined. Once the static state of the system is obtained (at 232) it can be used as the staring point (initial condition) 234 for simulation of the dynamic response of the drilling tool assembly drilling earth formation.

As shown in FIGS. 9A-D, once input data are provided and the static state of the drilling tool assembly in the wellbore is determined, calculations in the dynamic response simulation loop may be carried out. Briefly summarizing the functions performed in the dynamic response loop, the drilling tool assembly drilling earth formation is simulated by "rotating" the top of the drilling tool assembly (and the downhole motor, if used) through an incremental angle (at 242), and then calculating the response of the drilling tool assembly under the previously determined loading conditions 244 to the rotation(s). The constraint loads on the drilling tool assembly resulting from interaction with the wellbore wall during the incremental rotation are iteratively determined (in loop 245) and are used to update the drilling tool assembly constraint loads (i.e., global load vector), at 248, and the response is recalculated under the updated loading condition. The new response is then rechecked to determine if wall constraint loads have changed and, if necessary, wall constraint loads are re-determined, the load vector updated, and a new response calculated. Then the bottomhole constraint loads resulting from bit interaction with the formation during the incremental rotation are evaluated based on the new response (loop 252), the load vector is updated (at 279), and a new response is calculated (at 280). The wall and bottomhole constraint forces are repeatedly updated (in loop 285) until convergence of a dynamic response solution is determined (i.e., changes in the wall constraints and bottomhole constraints for consecutive solutions are determined to be negligible). The entire dynamic simulation loop is then repeated for successive incremental rotations until an end condition of the simulation is reached (at 290) or until simulation is otherwise terminated. A more detailed description of the elements in the simulation loop follows.

Prior to the start of the simulation loop, drilling operating parameters 206 are specified. As previously noted, the drilling operating parameters 206 include the rotary table speed, downhole motor speed (if included in the BHA), and the hook load. In this example, the end condition for simulation is also provided at 204, as either the total number of revolutions to be simulated or the total time for the simulation. Additionally, the incremental step desired for calculations should be defined, selected, or otherwise provided. In the embodiment shown, an incremental time step of $\Delta t=10^{-3}$ seconds is selected. However, it should be understood that the incremental time step is not intended to be a limitation on the invention.

Once the static state of the system is known (from 232) and the operational parameters are provided, the dynamic response simulation loop 240 can begin. In the first step of the simulation loop 240, the current time increment is calculated at 241, wherein $t_{i+1}=t_i+\Delta t$. Then, the incremental rotation which occurs during that time increment is calculated, at 242. In this embodiment, the formula used to calculate an incremental rotation angle at time $t_{i+1}$ is $\theta_{i+1}=\theta_i+RPM*\Delta t*60$, wherein RPM is the rotational speed (in RPM) of the rotary table provided as input data (at 204). The calculated incremental rotation angle is applied proximal to the top of the drilling tool assembly (at the node(s) corresponding to the position of the rotary table). If a downhole motor is included in the BHA, the downhole motor incremental rotation is also calculated and applied to the corresponding nodes.

Once the incremental rotation angle and current time are determined, the system's new configuration (nodal positions) under the extant loads and the incremental rotation is calculated (at 244) using mechanics analysis model modified to include the rotational input as an excitation. For example, a direct integration scheme can be used to solve the resulting dynamic equilibrium equations (modified mechanics analysis model) for the drilling tool assembly. The dynamic equilibrium equation (like the mechanics analysis equation) can be derived using Newton's second law of motion, wherein the constructed drilling tool assembly mass, stiffness, and damping matrices along with the calculated static equilibrium load vector can be used to determine the response to the incremental rotation. For the example shown in FIGS. 9A-D, it should be understood that at the first time increment $t_1$ the extant loads on the system are the static equilibrium loads (calculated for $t_0$) which include the static state WOB and the constraint loads resulting from drilling tool assembly contact with the wall and bottom of the wellbore.

As the drilling tool assembly is incrementally "rotated", constraint loads acting on the bit may change. For example, points of the drilling tool assembly in contact with the borehole surface prior to rotation may be moved along the surface of the wellbore resulting in friction forces at those points. Similarly, some points of the drilling tool assembly, which were nearly in contact with the borehole surface prior to the incremental rotation, may be brought into contact with the formation as a result of the incremental rotation, resulting in impact forces on the drilling tool assembly at those locations. As shown in FIGS. 9A-D, changes in the constraint loads resulting from the incremental rotation of the drilling tool assembly can be accounted for in the wall interaction update loop 245.

In this example, once the system's response (i.e., new configuration) under the current loading conditions is obtained, the positions of the nodes in the new configuration are checked (at 244) in the wall constraint loop 245 to determine whether any nodal displacements fall outside of the bounds (i.e., violate constraint conditions) defined by the wellbore wall. If nodes are found to have moved outside of the wellbore wall, the impact and/or friction forces which would have occurred due to contact with the wellbore wall are approximated for those nodes (at 248) using the impact and/or friction models or parameters provided as input at 208. Then the global load vector for the drilling tool assembly is updated (also shown at 208) to reflect the newly determined constraint loads. Constraint loads to be calculated may be determined to result from impact if, prior to the incremental rotation, the node was not in contact with the wellbore wall. Similarly, the constraint load can be determined to result from frictional drag if the node now in contact with the wellbore wall was also in contact with the wall prior to the incremental rotation. Once the new constraint loads are determined and the global load vector is updated, at 248, the drilling tool assembly response is recalculated (at 244) for the same incremental rotation under the newly updated load vector (as indicated by loop 245). The nodal displacements are then rechecked (at 246) and the wall interaction update loop 245 is repeated until a dynamic response within the wellbore constraints is obtained.

Once a dynamic response conforming to the borehole wall constraints is determined for the incremental rotation, the constraint loads on the drilling tool assembly due to interaction with the bottomhole during the incremental rotation are determined in the cone interaction loop 250. Those skilled in the art will appreciate that any method for modeling drill bit/earth formation interaction during drilling may be used to determine the forces acting on the drill bit during the incremental rotation of the drilling tool assembly. An example of one method is illustrated in the cone interaction loop 250 in FIGS. 9A-D.

In the cone interaction loop 250, the mechanics analysis model of the drill bit is subjected to the incremental rotation angle calculated for the lowest node of the drilling tool assembly, and is then moved laterally and vertically to the new position obtained from the same calculation, as shown at 249. As previously noted, the drill bit in this example is a roller cone drill bit. Thus, in this example, once the bit rotation and new bit position are determined, interaction between each cone and the formation is determined. For a first cone, an incremental cone rotation angle is calculated at 252 based on a calculated incremental cone rotation speed and used to determine the movement of the cone during the incremental rotation. It should be understood that the incremental cone rotation speed can be determined from all the forces acting on the cutting elements of the cone and Newton's second law of motion. Alternatively, it may be approximated from the rotation speed of the bit and the effective radius of the "drive row" of the cone. The effective radius is generally related to the lateral extent of the cutting elements that extend the farthest from the axis of rotation of the cone. Thus, the rotation speed of the cone can be defined or calculated based on the calculated bit rotational speed and the defined geometry of the cone provided as input (e.g., the cone diameter profile, cone axial offset, etc).

Then, for the first cone, interaction between each cutting element and the earth formation is determined in the cutting element/formation interaction loop 256. In this interaction loop 256, the new position of a cutting element, for example, cutting element j on row k, is calculated 258 based on the incremental cone rotation and bit rotation and translation. Then, the location of cutting element j,k relative to the bottomhole and wall of the wellbore is evaluated, at 259, to determine whether cutting element interference (or contact) with the formation occurred during the incremental rotation of the bit. If it is determined that contact did not occur, then the next cutting element is analyzed and the interaction evaluation is repeated for the next cutting element. If contact is determined to have occurred, then a depth of penetration, interference projection area, and scraping distance of the cutting element in the formation are determined, at 262, based on the next movement of the cutting element during the incremental rotation. The depth of penetration is the distance from the earth formation surface a cutting element penetrates into the earth formation. Depth of penetration can range from zero (no penetration) to the full height of the cutting element (full penetration). Interference projection area is the fractional amount of the cutting element surface area, corresponding to the depth of penetration, which actually contacts the earth formation. A fractional amount of contact usually occurs due to craters in the formation formed from previous contact with cutting elements. Scraping distance takes into account the movement of the cutting element in the formation during the incremental rotation. Once the depth of penetration, interference projection area, and scraping distance are determined for cutting element j,k these parameters are used in conjunction with the cutting element/formation interaction data to determine the resulting forces (constraint forces) exerted on the cutting element by the earth formation (also indicated at 262). For example, force may be determined using the relationship disclosed in U.S. Pat. No. 6,516,293, noted above and incorporated herein by reference.

Once the cutting element/formation interaction variables (area, depth, force, etc.) are determined for cutting element j, k, the geometry of the bottom surface of the wellbore can be temporarily updated, at 264, to reflect the removal of formation by cutting element j,k during the incremental rotation of the drill bit. The actual size of the crater resulting from cutting element contact with the formation can be determined from the cutting element/earth formation interaction data based on the bottomhole surface geometry, and the forces exerted by the cutting element. One such procedure is described in U.S. Pat. No. 6,516,293, noted above.

After the bottomhole geometry is temporarily updated, insert wear and strength can also be analyzed, as shown at 270, based on wear models and calculated loads on the cutting elements to determine wear on the cutting elements resulting from contact with the formation and the resulting reduction in cutting element strength. Then, the cutting element/formation interaction loop 260 calculations are repeated for the next cutting element (j=j+1) of row k until cutting element/formation interaction for each cutting element of the row is determined.

Once the forces on each cutting element of a row are determined, the total forces on that row are calculated (at 268) as a sum of all the forces on the cutting elements of that row. Then, the cutting element/earth formation interaction calculations are repeated for the next row on the cone (k=k+1) (in the row interaction loop 269) until the forces on each of the cutting elements on each of the rows on that cone are obtained. Once interaction of all of the cutting elements on a cone is determined, cone shell interaction with the formation is determined by checking node displacements at the cone surface, at 270, to determine if any of the nodes are out of bounds with respect to (or make contact with) the wellbore wall or bottomhole surface. If cone shell contact is determined to have occurred for the cone during the incremental rotation, the contact area and depth of penetration of the cone shell are determined (at 272) and used to determine interaction forces on the cone shell resulting from the contact.

Once forces resulting from cone shell contact with the formation during the incremental rotation are determined, or it is determined that no shell contact has occurred, the total interaction forces on the cone during the incremental rotation can be calculated by summing all of the row forces and any cone shell forces on the cone, at 274. The total forces acting on the cone during the incremental rotation may then be used to calculate the incremental cone rotation speed $\dot{\theta}_j$, at 276. Cone interaction calculations are then repeated for each cone (l=l+1) until the forces, rotation speed, etc. on each of the cones of the bit due to interaction with the formation are determined.

Once the interaction forces on each cone are determined, the total axial force on the bit (dynamic WOB) during the incremental rotation of the drilling tool assembly is calculated 278, from the cone forces. The newly calculated bit interaction forces are then used to update the global load vector (at 279), and the response of the drilling tool assembly is recalculated (at 280) under the updated loading condition. The newly calculated response is then compared to the previous response (at 282) to determine if the responses are substantially similar. If the responses are determined to be substantially similar, then the newly calculated response is considered to have converged to a correct solution. However, if the responses are not determined to be substantially similar, then the bit interaction forces are recalculated based on the latest response at 284 and the global load vector is again updated (as indicated at 284). Then, a new response is calculated by repeating the entire response calculation (including the wellbore wall constraint update and drill bit interaction force update) until consecutive responses are obtained which are determined to be substantially similar (indicated by loop 285), thereby indicating convergence to the solution for dynamic response to the incremental rotation.

Once the dynamic response of the drilling tool assembly to an incremental rotation is obtained from the response force update loop 285, the bottomhole surface geometry is then permanently updated (at 286) to reflect the removal of formation corresponding to the solution. At this point, output information desired from the incremental simulation step can be provided as output or stored. For example, the new position of the drilling tool assembly, the dynamic WOB, cone forces, cutting element forces, impact forces, friction forces, may be provided as output information or stored.

This dynamic response simulation loop 240 as described above is then repeated for successive incremental rotations of the bit until an end condition of the simulation (checked at 290) is satisfied. For example, using the total number of bit revolutions to be simulated as the termination command, the incremental rotation of the drilling tool assembly and subsequent iterative calculations of the dynamic response simulation loop 240 will be repeated until the selected total number of revolutions to be simulated is reached. Repeating the dynamic response simulation loop 240 as described above will result in simulating the performance of an entire drilling tool assembly drilling earth formations with continuous updates of the bottomhole pattern as drilled, thereby simulating the drilling of the drilling tool assembly in the selected earth formation. Upon completion of a selected number of operations of the dynamic response simulation loop, results of the simulation may be used to generate output information at 294 characterizing the performance of the drilling tool assembly drilling the selected earth formation under the selected drilling conditions, as shown in FIGS. 9A-D. It should be understood that the simulation can be stopped using any other suitable termination indicator, such as a selected wellbore depth desired to be drilled, indicated divergence of a solution, etc.

Figure 9A:
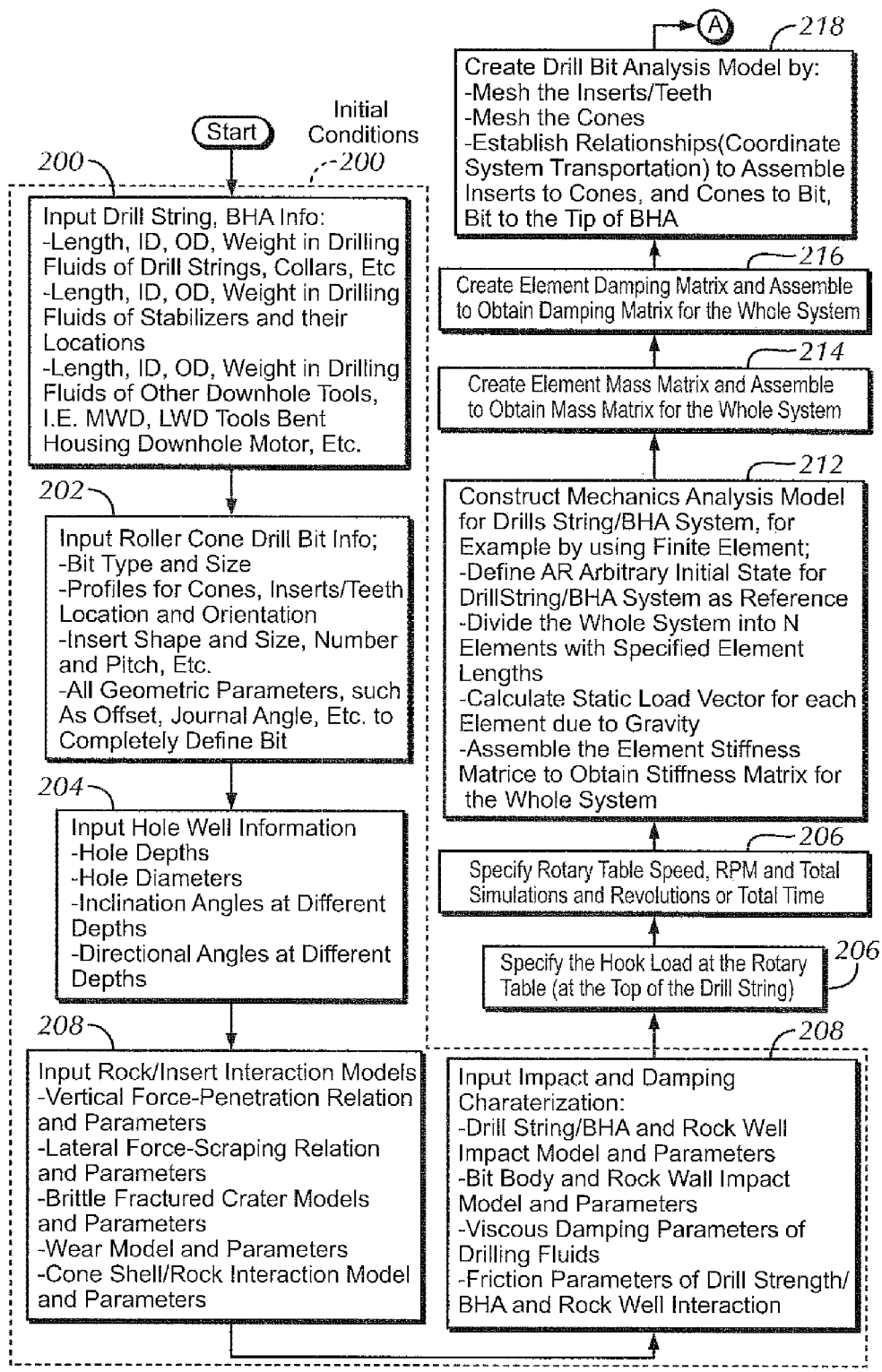
FIG. 9A-D are flowchart diagrams of methods to identify design parameters for a drilling tool assembly in accordance with embodiments of the present disclosure.
Figure 9B:
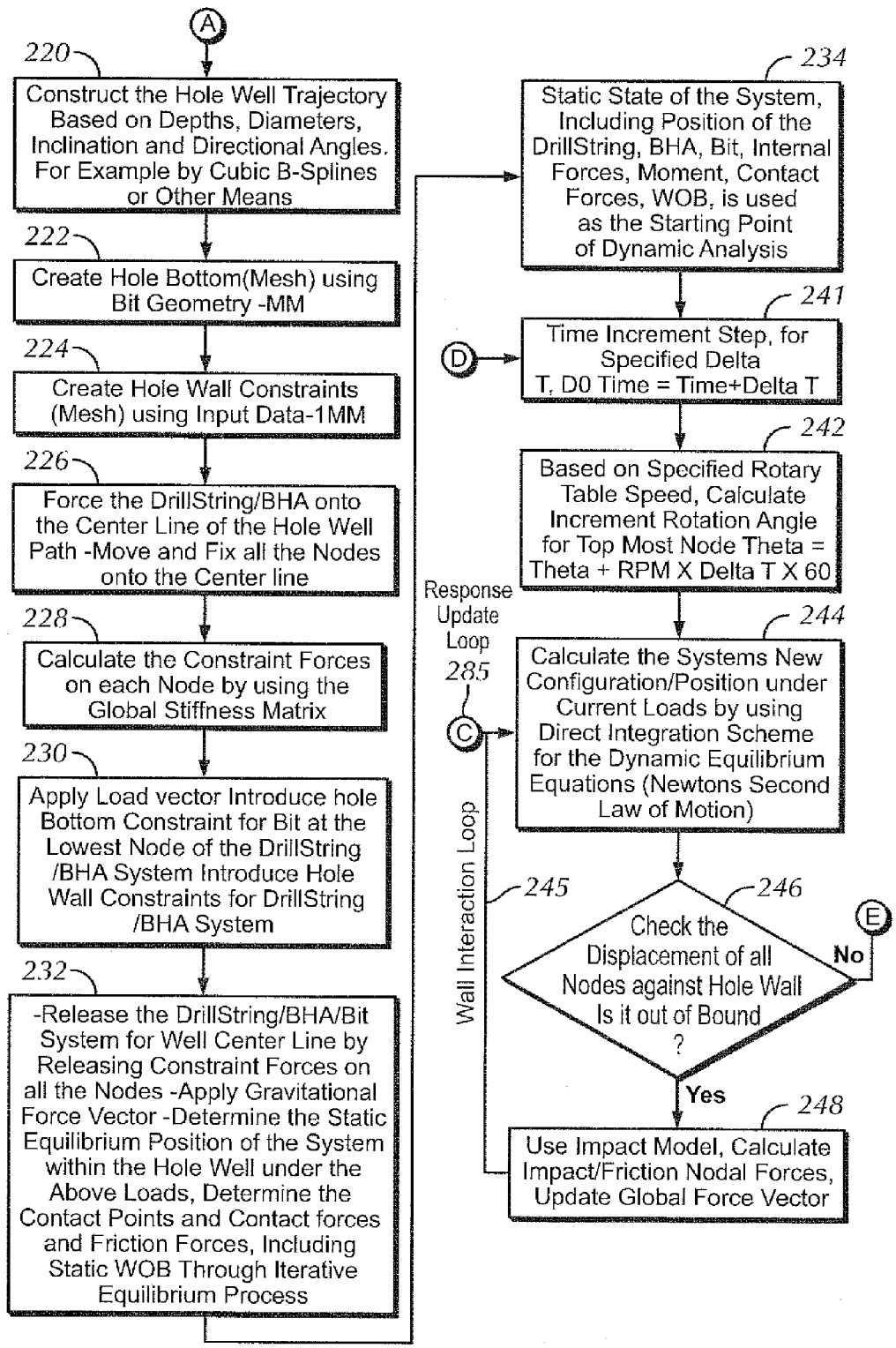
Figure 9C:
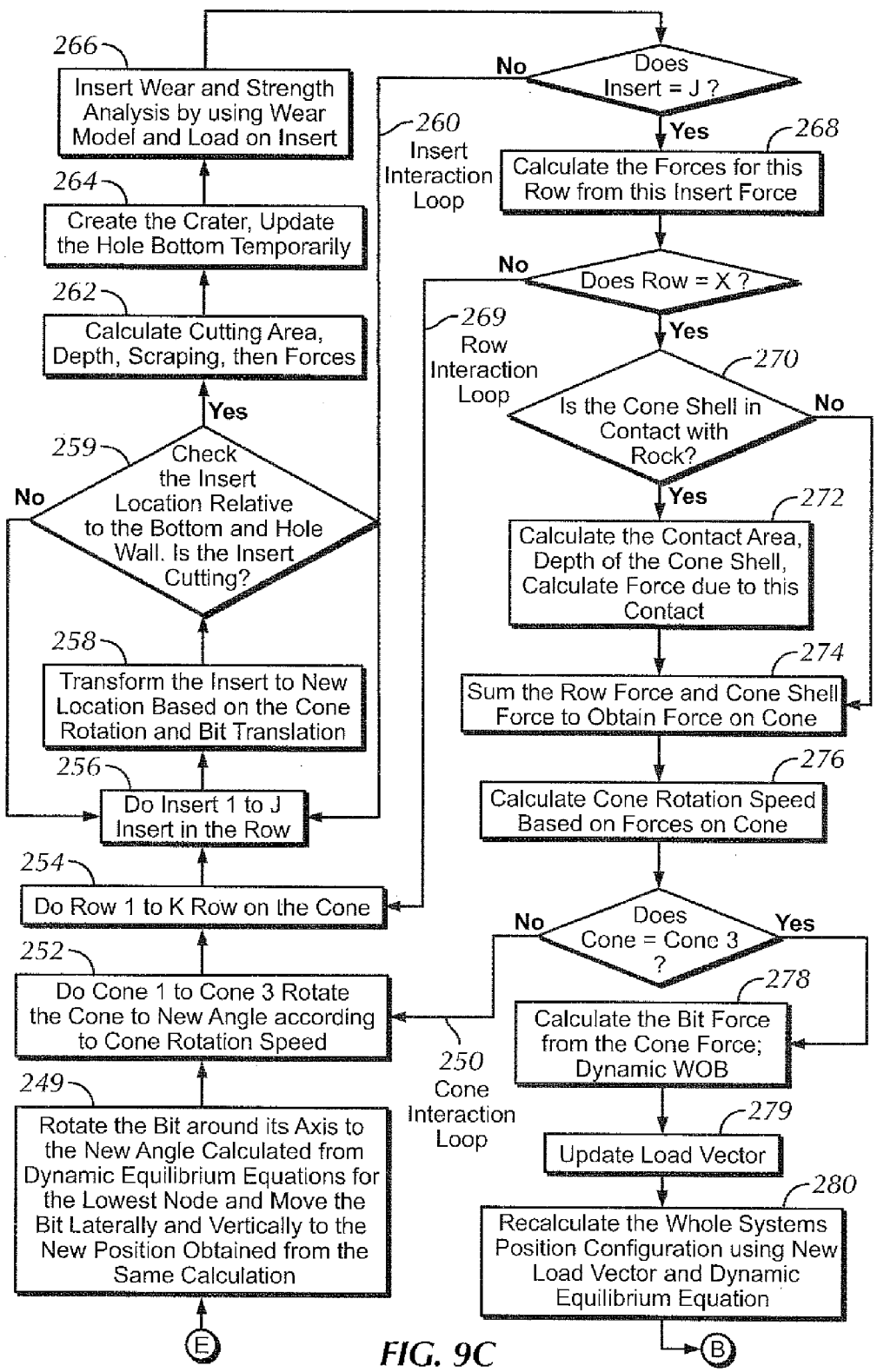
Figure 9D:
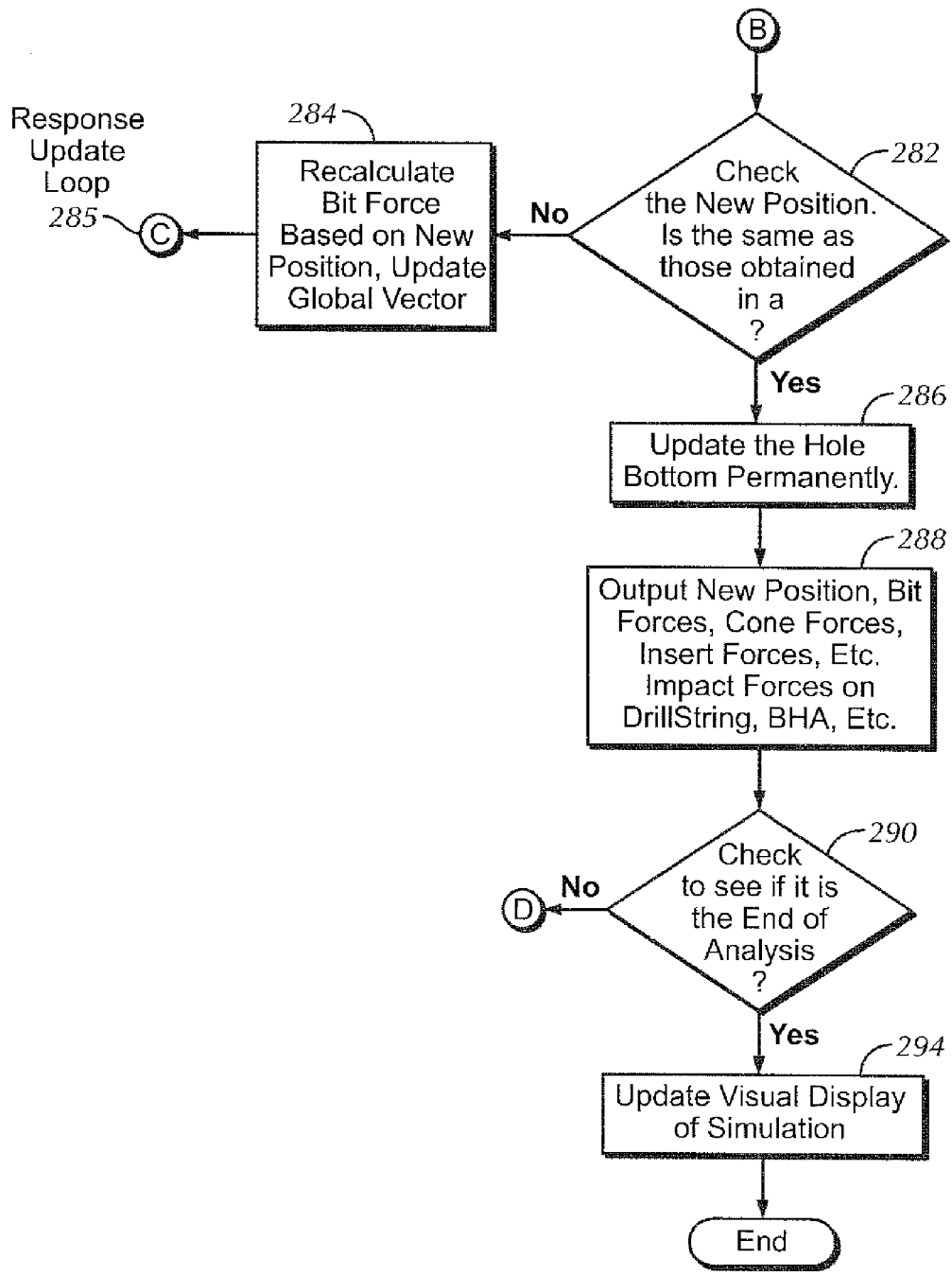
Figure 9E:
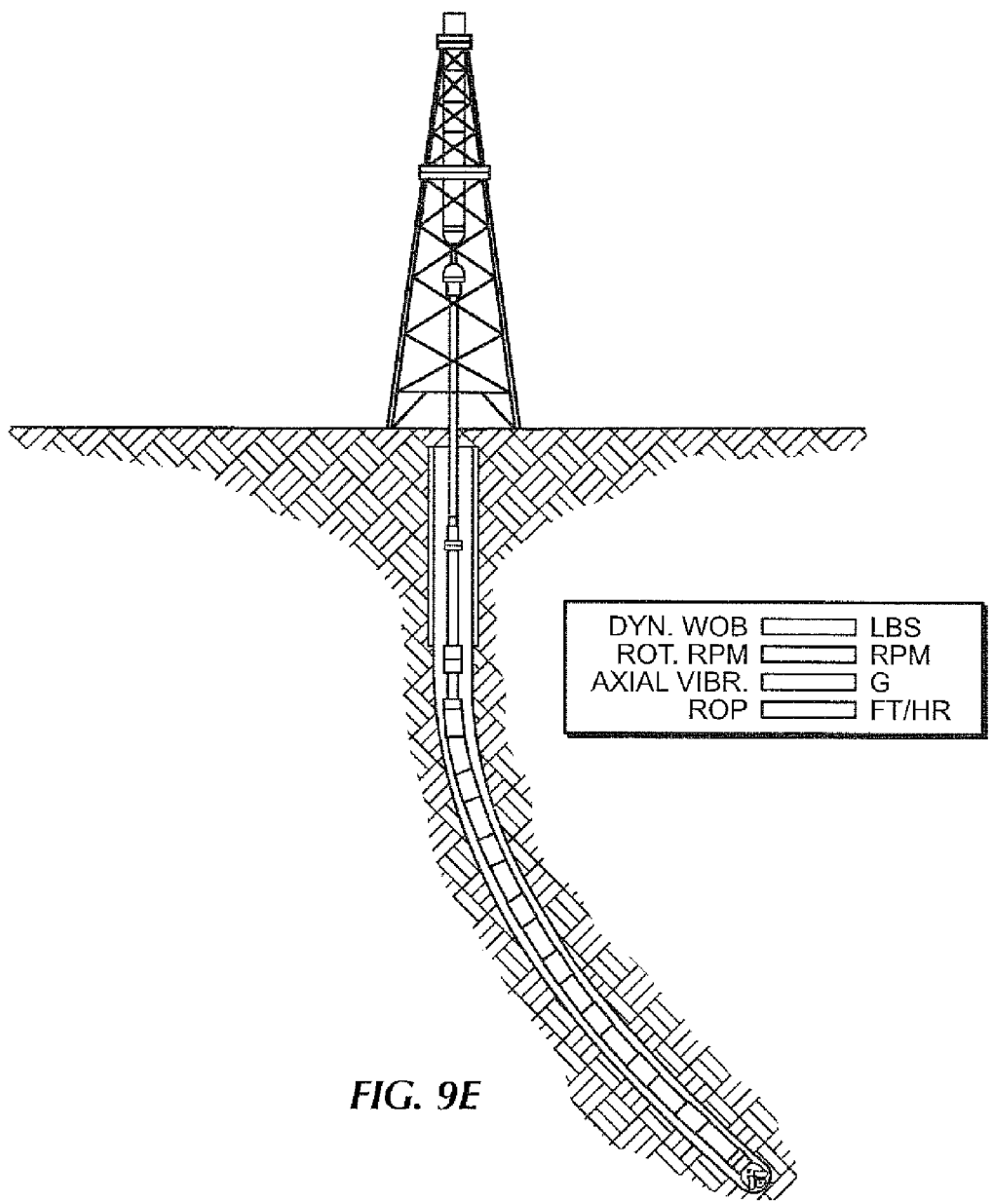
FIG. 9E is a visual representation in accordance with an embodiment of the present disclosure.

As noted above, output information from a dynamic simulation of a drilling tool assembly drilling an earth formation may include, for example, the drilling tool assembly configuration (or response) obtained for each time increment, and corresponding bit forces, cone forces, cutting element forces, impact forces, friction forces, dynamic WOB, resulting bottomhole geometry, etc. This output information may be presented in the form of a visual representation (indicated at 294), such as a visual representation of the borehole being drilled through the earth formation with continuous updated bottomhole geometries and the dynamic response of the drilling tool assembly to drilling presented on a computer screen. Alternatively, the visual representation may include graphs of parameters provided as input and/or calculated during the simulation. For example, a time history of the dynamic WOB or the wear of cutting elements during drilling may be presented as a graphic display on a computer screen. It should be understood that the invention is not limited to any particular type of display. Further, the means used for visually displaying aspects of simulated drilling is a matter of convenience for the system designer, and is not intended to limit the present disclosure. One example of output information converted to a visual representation is illustrated in FIG. 9E, wherein the rotation of the drilling tool assembly and corresponding drilling of the formation is graphically illustrated as a visual display of drilling and desired parameters calculated during drilling can be numerically displayed.

The example described above represents only one embodiment of the present disclosure. Those skilled in the art will appreciate that other embodiments can be devised which do not depart from the scope of the disclosure as described herein. For example, an alternative method can be used to account for changes in constraint forces during incremental rotation. For example, instead of using a finite element method, a finite difference method or a weighted residual method can be used to model the drilling tool assembly. Similarly, other methods may be used to predict the forces exerted on the bit as a result of bit/cutting element interaction with the bottomhole surface. For example, in one case, a method for interpolating between calculated values of constraint forces may be used to predict the constraint forces on the drilling tool assembly or a different method of predicting the value of the constraint forces resulting from impact or frictional contact may be used. Further, a modified version of the method described above for predicting forces resulting from cutting element interaction with the bottomhole surface may be used. These methods may be analytical, numerical (such as finite element method), or experimental. Alternatively, methods such as disclosed in SPE Paper No. 29922 noted above or PCT Patent Application Nos. WO 00/12859 and WO 00/12860 may be used to model roller cone drill bit interaction with the bottomhole surface, or methods such as disclosed in SPE papers no. 15617 and no. 15618 noted above may be used to model fixed-cutter bit interaction with the bottomhole surface if a fixed-cutter bit is used.

One of ordinary skill in the art will appreciate that the above described method of identifying design parameters for a drilling tool assembly may provide experience data useful in the training of ANNs. However, the above described method is merely exemplary, and is not intended as a limitation on the type of program that may provide experience data. Thus, in certain embodiments, multiple drilling tool assembly design methods may be combined to provide a plurality of sources of experience data, while in other embodiments, experience data may include a single source of drilling tool assembly design data. Methods of simulating well drilling tool assemblies are discussed in greater detail in U.S. Pat. Nos. 6,785,641 and 7,020,597 to Sujan Huang, assigned to the assignee of the present invention, and hereby incorporated by reference herein.

Method of Generating a Drilling Tool Assembly Order

Figure 10:
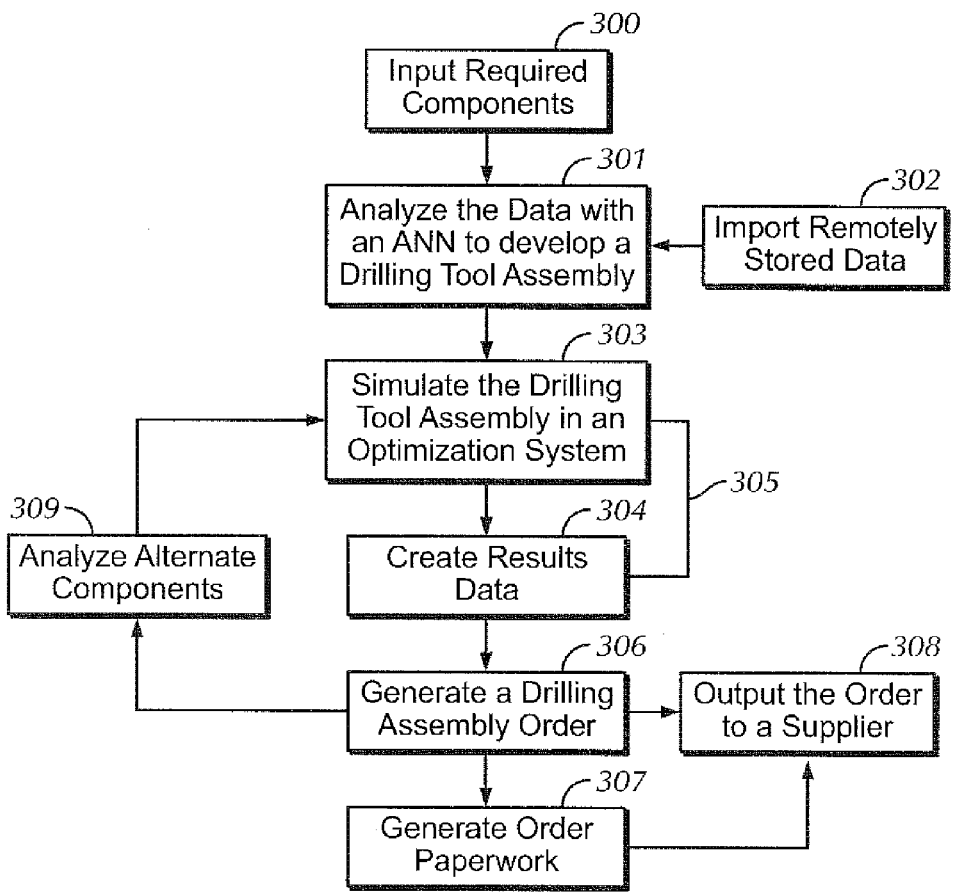
FIG. 10 is a flowchart diagram of a method of generating a drilling tool assembly order in accordance with embodiments of the present disclosure.

Referring to FIG. 10, a flowchart diagram of a method of generating a drilling assembly order according to embodiments of the present disclosure is shown. In this embodiment, the method may include an ANN driven optimization system, wherein required components for a drilling assembly are input 300 into the optimization system. Examples of required components may include, for example, well data and/or other data a drilling engineer may optionally include as constraints in the design process. Additionally, remotely stored data, including experience data, historical bit run data, offset well data, and previous simulation data, may then be input 302 into the optimization system. The data is then analyzed 301 with an ANN to develop a drilling tool assembly. This analyzing 301 may include, comparing experience data against any of the experience data or training the ANN with new data, as described above. After the ANN 301 develops an initial drilling tool assembly, the optimization system simulates 303 the initial drilling tool assembly in the optimization system. In the system, the ANN driven optimization system creates results data 304, and using such data, determines whether to continue simulating the drilling tool assembly or terminate the optimization.

In one embodiment, the optimization system may create results data 304 and output the data to a visual display, as described above, in the form of a visual or graphical representation for a drilling engineer to view. However, in alternate embodiments, the system may use the results data to determine whether additional simulations are required to optimize the drilling tool assembly. If the optimization system determines that additional optimization loops 305 are required, the system may re-simulate the drilling tool assembly after adjusting the drilling tool assembly design according to suggestions for optimization included in the results data. This loop 305 may continue until a specified condition of the drilling tool assembly (e.g., a vibrational signature, a dull grade, a wear condition, an ROP, or other conditions, as described above) is satisfied. When such a condition is satisfied, and the drilling tool assembly is optimized, the optimized drilling tool assembly design is output, or otherwise processed by the optimization system, to generate a drilling tool assembly order 306.

The drilling tool assembly order may include, for example, an order guide for a number of drilling tool assembly components. Such components may include drill collars, drill bits, cuttings elements, stabilizers, reamers, hole openers, tubular connections, or other components of drilling tool assembly that may be found on a BHA, a drill string, a drill bit, a sub, a stabilizer, a heavy weight drill plate, a downhole measurement device, a downhole drive device, or other devices incorporated into a drilling operation. Furthermore, in certain drilling operations, the drilling tool assembly parameters, drilling parameters, conditions of the formation, and other drilling conditions may allow the optimization system to determine and generate orders for other parts of the drilling operations. The order may be generated according to the anticipated requirements of a specific drilling operation. For example, in one embodiment, the results data and order generated may indicate that an optimized drilling tool assembly includes a specific PDC drill bit with a hole opener, a spacer, and a particular drill collar, and a number of rig instrumentation devices. The optimization system may then generate such an order, and communicate (i.e., output) the order to at least one of a drilling engineer, an order service, a remote data store, or directly to the parts supplier. Thus, individual order components may be included to each of the suppliers, or in some aspects, the entire order may be generated such that contractor services may bid on supplying the order. Furthermore, the optimization system may generate and store several orders, such that a single order may be communicated to a supplier or a drilling engineer at a later time.

Examples of drilling component suppliers may include, but are not limited to, any one of the following: a drilling contractor (providing a drilling rig and related tubular equipment (drill pipe, etc.)); rig instrumentation (responsible for process measurements related to well drilling and construction); a drilling fluids contractor (responsible for drilling fluid used in drilling and completions phases of a project); a directional drilling service (specialty personnel for drilling directional well paths); a logging while drilling (LWD) or measurement while drilling (MWD) provider (a provider of tools used down hole to measure aspects of a well path); a mud logging service (geological and engineering data recording, analysis and presentation); pore pressure detection (a specialty service for maintaining safety in over-pressured drilling environments); a safety monitoring service (where poisonous gas is a possibility); a casing service (a specialty service for running casings into the well bore); a cementing service (a specialty service for cementing steel casing in place in a well bore); a communications or satellite provider (a communications service for data and telephony from a rig site location); an equipment supplier (fuel, drilling water, potable water, food and housing services, and consumable items such as drill bits, casing, materials, etc.); and transportation such as trucking, cranes, aircraft, support vessels for offshore wells).

The drilling optimization system may, in certain embodiments, communicate directly with the drilling component suppliers. In such an embodiment, a communication system, as described below, may provide a method of communication between the optimization system and the supplier.

Method of Communicating between the Optimization System and a Supplier

Figure 11:
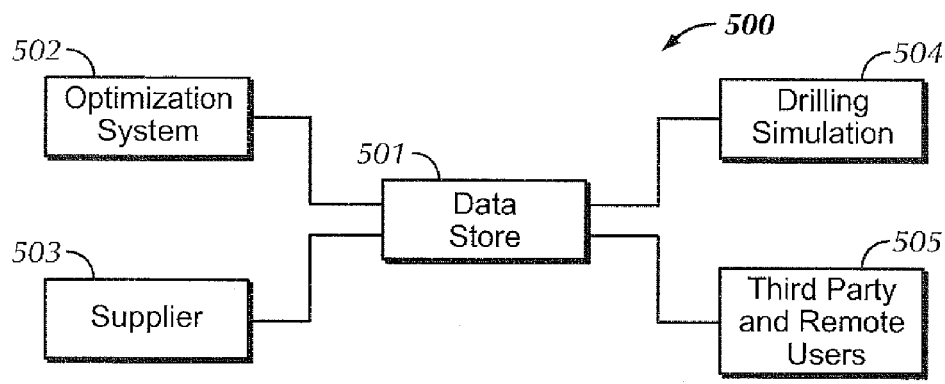
FIG. 11 is a schematic diagram of a drilling communications system in accordance with embodiments of the present disclosure.

Referring now to FIG. 11, a schematic of drilling communications system 500 in accordance with embodiments of the present disclosure is shown. A drilling tool optimization system 502 is connected to a remote data store 501. As data is collected from optimization system 502, the data is transmitted to data store 501.

In certain embodiment, the remote data store may use a Wellsite Information Transfer Standard ("WITSML") data transfer standard. Other transfer standards may also be used without departing from the scope of the present disclosure.

Additional party connections to data store 501 may include an oilfield services supplier 503, an additional drilling simulator 504, and third party and remote users 505. In some embodiments, each of the different parties 502, 503, 504, 505 that have access to data store 501 may be in different locations. In addition, embodiments of the present disclosure do not preclude supplier 503 from transmitting the LWD/MWD measurement data to a separate site for analysis before the data is uploaded to data store 501.

In addition to having data store 501 located on a secure server, in some embodiments, each of the parties connected to data store 501 has access to view and update only specific portions of the data therein. For example, a supplier 503 may be restricted such that they cannot upload data related to drill cutting analysis, a measurement which is typically not performed by the vendor.

As measurement data becomes available, it may be uploaded to data store 501. The data may be correlated to the particular position drilling tool assembly design parameter to which the data relates, a particular time stamp when the measurement was taken, or both. The simulated result data (e.g., WOB, TOB, RPM, vibrational signature etc.) will generally relate to a component of the drilling tool assembly as it is being simulated. As this data is uploaded to data store 501, it will typically be correlated to a level of optimization when such result data was obtained.

Thus, those of ordinary skill in the art will appreciate that remote communication and storage systems may allow direct communication between a drilling optimization system and a supplier, or may otherwise allow the dissemination of a drilling tool assembly order to a supplier. While the above described system may provide such communication, other methods of communication may also be utilized that include paper based communication, direct networked communication, or displaying order information to a drilling engineer. Additional description of communication systems that may be used with embodiments disclosed herein are described in U.S. Patent Application No. 60/765,694 to Moran, hereby incorporated by reference in its entirety.

Referring back to FIG. 10, in certain embodiments, the optimization system may be able to generate surface equipment orders to order, for example, shaker screens, drilling fluids, environmental units, cleaning operations, drilling fluids, shakers, thermal desorption units, centrifuges, hydrocyclones, and/or other components used in drilling operations. The specific components that may be required for a drilling operation may be determined based on well data and experience data that includes, for example, the type of environmental cuttings remediation operations that may be most effective for a certain formation. For example, in one embodiment, an output of the ANN, optimization system, or a results data may indicate that for a well drilling operation using an specified optimized drilling tool assembly wellbore would operate most efficiently using specified drilling parameters. Then, the optimization system would compare the optimized drilling tool assembly and the optimized drilling parameters to generate an order for a specific drilling fluid that would further promote the optimized drilling parameters and the optimized drilling tool assembly. The optimization system then determines the about of formation (i.e., a cuttings volume) being removed by such a drilling tool assembly operating in the formation (data which is already known by the system as a result of the simulation), and determines an appropriate environmental remediation operation to handle the predicted volume of formation cuttings. Furthermore, the optimization system may include a determination of which drilling fluids may be used in the operation.

For example, because the optimization system already has determined a volume of formation being removed, and an optimal ROP of the drilling operation, the optimization system may further predict the number of vibratory separators required to handle the cuttings volume. Additionally, because the optimization system has access to the drilling fluid types available for the drilling operation, the system may further select any additional remediation tools that may be required to meet, for example, specified environmental regulations. Thus, in one embodiment, the optimization system may generate an order for a drilling tool assembly, a volume of drilling fluid required for the operation, the number of vibratory shakers, the type of shaker screen that would most effectively filter the formation (e.g., by based the filtering requirements on a volume of cuttings, a fluid type, and a formation type), and order any chemicals needed in other environmental remediation operations. In addition to providing for an optimized drilling tool assembly design, the optimization system may be to used to generate an order for the drilling tool assembly 306, as well as generate orders for additional components that may be required in the drilling operation.

After the order is generated 306, the optimization system may output the order in the form of generating paperwork 307 to be handled by a drilling engineer, or the order may be directly output to a supplier 308 of the drilling tool assembly components, as described above. Thus, those of ordinary skill in the art will appreciate that the automated ordering capabilities of such a system may effectively remove the need for human interaction with the optimization system during drilling tool assembly design. Furthermore, because the optimization system is driven by an ANN, the system may be trained to, or may over time develop, a number of neural interconnects that allow for optimized designs and ordering procedures.

In another embodiment, after the drilling assembly order is generated 306, the optimization system may analyze alternate components 309 to determine if additional drilling tool assembly components are required. Additionally, in one aspect, after the optimization system determines the required components for a drilling operation, the system may enter another optimization loop, as described above, to position the optimized components on the drill sting in an appropriate location. Thus, the optimization system may, in certain embodiments, generate a drilling assembly order 306 for components, and while such order is being processed, run additional optimization loops. The system may then generate a design guide for the drilling tool assembly and drilling operations that specifies, for example, locations of components of the drilling tool assembly, optimized drilling parameters for the drilling operations, and additional components of the drilling operations. In such an embodiment, because the system is capable of generating detailed assembly orders including specific parts, tolerances, materials, locations, and operating parameters, the optimization system may be used to develop a plan for a drilling operation. The plan that is generated by the optimization system may include choices of one or more ANNs, and may thus be generated in less time, and with greater optimization potential than previously attainable.

Advantageously, embodiments of the present disclosure provide drilling engineers with an optimization system that is ANN driven, and may thus reduce the number of iterative simulations required when designing drilling tool assemblies. Additionally, by reducing the number of simulations required to optimize drilling tool assemblies, the work process for designing such drilling tool assemblies may be more efficient, thereby decreasing the cost of the design of such drilling tool assemblies. Furthermore, the optimization system may be dynamically upgradeable, such that each iterative simulation of a drilling tool assembly is stored in a database, and may be used to train ANNs to further increase the robustness of the optimization system. Such simulation data, and the analyzed results of the ANN may also be used to increase the speed of subsequent simulations. Thus, the more times the ANN simulates a drilling tool assembly, the more efficient the optimization is during the design on subsequent initial drilling tool assemblies.

Because each initial drilling tool assembly design is based, at least in part, on all preceding optimizations, as the neural interconnects of the ANN increase, the efficiency of the system will also increase. Also, advantageously, embodiments of the present disclosure may be used to develop drilling tool assembly designs with specified desirable conditions. Examples of such conditions may include, drilling tool assemblies with an optimal vibration signature, dull grade, bit wear, or other specific optimized parameter.

In certain embodiments of the present disclosure, methods disclosed herein may provide a drilling engineer with a substantially automated system for designing drilling tool assemblies, and subsequently, orders such assemblies. As described above, methods disclosed herein provide for an optimization system that may generate and order drilling tool assemblies, drilling operation components, and determine the placement of such components of a drilling operation. Thus, the optimization system may further increase the efficiency of the entire drilling operation by selecting components of a drilling operation without additional input from a drilling engineer.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the present disclosure should be limited only by the attached claims.

What is claimed is:

1. A method of optimizing a drilling tool assembly comprising:
    inputting well data into an optimization system, the optimization system including an experience data set and an artificial neural network;
    comparing the well data to the experience data set;
    developing an initial drilling tool assembly based on the comparing the well data to the experience data, the initial drilling tool assembly including at least one expandable tool, wherein the drilling tool assembly is developed using the artificial neural network;
    simulating the initial drilling tool assembly in the optimization system;
    creating result data in the optimization system based on the simulating; and
    optimizing placement of the expandable tool in the drilling tool assembly based on the result data.

2. The method of claim 1,
    wherein the optimizing placement of the at least one expandable tool in the drilling tool assembly comprises:
        adjusting at least one drilling tool assembly design parameter of the initial drilling tool assembly based on the result data to produce an adjusted drilling tool assembly;
        re-simulating the adjusted drilling tool assembly in the optimization system to produce a second result data; and
        adjusting at least one drilling tool assembly design parameter of the adjusted drilling tool assembly based on the second result data.

3. The method of claim 2, further comprising:
    continuing the optimizing until an optimized placement of the at least one expandable tool is achieved.

4. The method of claim 1, wherein the experience data comprises at least one selected from a group consisting of historical bit run data, offset well data, and prior simulation data.

5. The method of claim 1, wherein the drilling tool assembly design parameter is at least one selected from a group consisting of a bit, a cutting element, a drilling tool assembly component, a mud weight, a weight on bit, a rotary torque, a rotary speed, a lateral force on bit, a ratio of forces on cones, a ratio of forces between the cones, a distribution of forces on cutting elements, a volume of formation cut, and a wear on cutting elements.

6. The method of claim 1, wherein the simulating the initial drilling tool assembly in the optimization system comprises simulating the at least one expandable tool in at least one of an expanded position and a collapsed position.

7. The method of claim 1, further comprising:
generating a drilling tool assembly order based on the result data; and
outputting the drilling tool assembly order.

8. The method of claim 1, wherein the at least one expandable tool comprises at least one of a group consisting of an expandable reamer and an expandable stabilizer.

9. The method of claim 1, wherein the experience data set is stored in a remote web store.

10. The method of claim 9, wherein the remote web store is accessible by the artificial neural network.

11. The method of claim 1, wherein the well data comprises at least one of a group consisting of a well type, a formation type, an acceptable vibrational signature, an acceptable rate of penetration, an acceptable wear rate, and an acceptable well path direction.

12. The method of claim 1, further comprising:
training the artificial neural network with the experience data set before developing the initial drilling tool assembly.

13. The method of claim 12, wherein the trained neural network comprises at least one of a vibrational artificial neural network, a bit wear artificial neural network, a rate of penetration artificial neural network, a directional artificial neural network, and a mud flow rate artificial neural network.

14. A method of designing a drilling tool assembly comprising:
inputting well data into an optimization system, the optimization system including an experience data set and an artificial neural network;
comparing the well data to the experience data set;
developing an initial drilling tool assembly based on the comparing the well data to the experience data, the initial drilling tool assembly including at least one expandable tool, wherein the initial drilling tool assembly is developed using the artificial neural network;
simulating the drilling tool assembly in the optimization system, the simulating comprising simulating the at least one expandable tool in at least one of an expanded position and a collapsed position;
determining a vibrational signature of the initial drilling tool assembly; and
adjusting a placement of the at least one expandable tool in the initial drilling tool assembly based on the vibrational signature to produce an adjusted drilling tool assembly.

15. The method of claim 14, wherein the adjusting the initial drilling tool assembly based on the vibrational signature comprises:
adjusting the location of the expandable tool on a drill string.

16. The method of claim 14, further comprising:
simulating the adjusted drilling tool assembly in the optimization system;
adjusting at least one drilling tool assembly design parameter based on the simulation of the adjusted drilling tool assembly; and
terminating the simulating and the adjusting when the drilling tool assembly is optimized.

17. The method of claim 14, further comprising:
training the artificial neural network in a drilling application to create a trained artificial neural network, wherein the training comprises:
providing a training data set to the artificial neural network, wherein the data set comprises known input variables and known output variables that correspond to the input variables; and
providing experience data to the artificial neural network, and
predicting vibrational responses for the drilling tool assembly with the trained artificial neural network predicts.

18. A method of optimizing a drilling tool assembly comprising:
inputting well data into an optimization system, the optimization system including an experience data set and an artificial neural network;
comparing the well data to the experience data set;
developing an initial drilling tool assembly based on the comparing the well data to the experience data, the initial drilling tool assembly including at least one of a stabilizer and a reamer, wherein the drilling tool assembly is developed using the artificial neural network;
simulating the initial drilling tool assembly in the optimization system;
creating result data in the optimization system based on the simulating; and
optimizing placement of the at least one stabilizer and reamer in the drilling tool assembly based on the result data.

19. The method of claim 18, further comprising:
continuing the optimizing until an optimized placement of the at least one stabilizer and reamer is achieved.

20. The method of claim 18, further comprising: wherein the simulating the initial drilling tool assembly in the optimization system comprises simulating the at least one stabilizer and reamer in at least one of an expanded position and a collapsed position.

* * * * *